United States Patent
Reed

(10) Patent No.: US 8,341,553 B2
(45) Date of Patent: *Dec. 25, 2012

(54) SELECTION INTERFACE SYSTEMS AND METHODS

(75) Inventor: George Reed, Berkeley, CA (US)

(73) Assignee: George William Reed, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,851

(22) Filed: Oct. 28, 2010

(65) Prior Publication Data

US 2011/0041095 A1    Feb. 17, 2011

Related U.S. Application Data

(63) Continuation-in-part of application No. 11/833,690, filed on Aug. 3, 2007, now Pat. No. 7,861,179, which is a continuation of application No. 10/444,329, filed on May 22, 2003, now Pat. No. 7,254,785, which is a continuation-in-part of application No. 10/357,803, filed on Feb. 3, 2003, now Pat. No. 7,207,013, which is a continuation of application No. 09/507,474, filed on Feb. 17, 2000, now Pat. No. 6,552,739.

(51) Int. Cl.
*G06F 3/00* (2006.01)
*G06F 3/048* (2006.01)

(52) U.S. Cl. .................................. 715/834; 715/738

(58) Field of Classification Search .................. 715/763, 715/834, 840, 841, 850, 851, 853
See application file for complete search history.

(56) References Cited

U.S. PATENT DOCUMENTS

| | | | | |
|---|---|---|---|---|
| 5,490,245 A | * | 2/1996 | Wugofski | 715/840 |
| 5,611,049 A | * | 3/1997 | Pitts | 707/999.008 |
| 5,706,448 A | * | 1/1998 | Blades | 715/834 |
| 5,721,853 A | * | 2/1998 | Smith | 715/803 |
| 5,745,717 A | * | 4/1998 | Vayda et al. | 715/834 |
| 5,828,360 A | * | 10/1998 | Anderson et al. | 715/834 |
| 6,031,471 A | | 2/2000 | Wilson | |

(Continued)

OTHER PUBLICATIONS

Steven Wittens, Farbtastic: jQuery color picker plug-in, Jan. 8, 2007, pp. 1-5.*

(Continued)

*Primary Examiner* — Weilun Lo
*Assistant Examiner* — Truc Chuong
(74) *Attorney, Agent, or Firm* — Michael A. Glenn; Glenn Patent Group

(57) ABSTRACT

A user selection interface system comprises one or more rotatable selectors linked to selectable characteristics, and a display linked to the selectors, for display of an image that corresponds to the selected characteristics. The interface is typically linked to a database comprising stored image and other information which corresponds to the selectable characteristics, whereby an image that corresponds to an item which meets a selected characteristic is retrieved and displayed. Information other than the image which corresponds to the selectable characteristics may also be retrieved and displayed. In some embodiments, the stored images comprise a single image, which matches all the selected characteristics. In alternate embodiments, the displayed image comprises a composite image that is based upon stored images which correspond to different selected characteristics. In some embodiments, the user selection interface comprises a graphic user interface. In alternate embodiments, the user selection interface comprises a mechanical interface. Some preferred embodiments of the user selection interface provide links for merchandising functions, such as for ordering, purchasing, inventories, and/or shipping.

30 Claims, 28 Drawing Sheets

U.S. PATENT DOCUMENTS

| | | |
|---|---|---|
| 6,249,772 B1 | 6/2001 | Walker et al. |
| 6,304,855 B1 | 10/2001 | Burke |
| 6,414,693 B1 | 7/2002 | Berger et al. |
| 6,552,739 B1 | 4/2003 | Reed |
| 7,036,090 B1 * | 4/2006 | Nguyen ................ 715/834 |
| 7,080,070 B1 | 7/2006 | Gavarini |
| 7,096,431 B2 * | 8/2006 | Tambata et al. ............ 715/834 |
| 7,107,226 B1 | 9/2006 | Cassidy et al. |
| 7,207,013 B2 | 4/2007 | Reed |
| 7,400,915 B2 * | 7/2008 | Wong et al. ............ 455/575.3 |
| 7,533,041 B2 | 5/2009 | Reed |
| 2001/0013014 A1 | 8/2001 | Fukumuro |
| 2002/0128151 A1 | 9/2002 | Galligan et al. |
| 2003/0095096 A1 | 5/2003 | Robbin et al. |

OTHER PUBLICATIONS

Callahan et al., An Empirical Comparison of Pie vs. Linear Menus, Jan. 1, 1988, pp. 1-14.*

DevComponents, C1 Knob Control, Jul. 30, 2010, pp. 1-5.*

Batdorff, L.; "Companies Turn to Internet to Cut Catalogs' Weight"; May 19, 1997, Technology, p. 17.

Anon., "HP Products Now Available at U.S. Navy's ITEC Mall", PR Newswire, Aug. 12, 1998.

* cited by examiner

| | | |
|---|---|---|
| NEW | FOLDER NAME | 008X008G017.HTML — 862  864 |

PAGE IDENTITY  .../008X008G017.html  DONT FILL THIS IN

| | |
|---|---|
| CATEGORY | HOT DIPPED GALVANIZED WIRE MESH |
| DESCRIPTION | 4 MESH .035 Wire Diameter |
| PART NUMBER ○ | 008X008G017 |
| PRIMARY PHOTO I.D. NUMBER MVC | 248 |
| RULER SIZE | 3" x 2" |
| holes shown left to right | 24 |
| holes shown top to bottom | 16 |
| ABOVE PHOTO COMMENT | |
| ABOVE PHOTO COMMENT LINK | |
| comment done | no |

NO LINK    NONE
LINK TOO NEXT FINER WEAVE
IN THIS CATEGORY

LINK TO NEXT
HEAVIER WIRE DIAMETER
IN THIS CATEGORY
NO LINK
     NONE

LINK TO NEXT
LIGHTER WIRE DIAMETER
IN THIS CATEGORY
008X008G013
     250

004X004D025
LINK TO NEXT COARSER WEAVE    251
IN THIS CATEGORY

COMMENTS

Pictured above is extra heavy commercial grade 8 mesh, 27 gauge, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

price table comments: Prices are in U.S. dollars per roll. Rolls are 100 feet in length. Inquire about larger quantity pricing. Various warehouses and excellent freight programs are available.

| | |
|---|---|
| ALTERNATIVE VIEW #1 | NO LINK AVAILABLE YET |
| ALTERNATIVE VIEW #2 | NO LINK AVAILABLE YET |
| DATA EXCEL SPREAD SHEET NAME | 008X008G017DATA |
| PRICING EXCEL SPREAD SHEET NAME | 008X008G017PRICES |
| DISK EXCEL SPREAD SHEET NAME | 008X008G017discs |

| NEW | FOLDER NAME | 002X002D041.HTML | 872 | 874 |

PAGE IDENTITY .../002X002D041.html  DONT FILL THIS IN

CATEGORY: HOT DIPPED GALVANIZED WIRE MESH
DESCRIPTION: 2 MESH .041 Wire Diameter
PART NUMBER ○ 002X002D041
PRIMARY PHOTO I.D. NUMBER MVC: 253
RULER SIZE: 3" x 2"
holes shown left to right: 6
holes shown top to bottom: 4
ABOVE PHOTO COMMENT:
ABOVE PHOTO COMMENT LINK:
comment done: no

004X004G035     252
LINK TOO NEXT FINER WEAVE
IN THIS CATEGORY

LINK TO NEXT
HEAVIER WIRE DIAMETER
IN THIS CATEGORY
002X002D063
264

LINK TO NEXT
LIGHTER WIRE DIAMETER
IN THIS CATEGORY
NO LINK
NONE

NO LINK
LINK TO NEXT COARSER WEAVE     NONE
IN THIS CATEGORY
COMMENTS

Pictured above is extra heavy commercial grade 2 mesh, 19 gauge, hot-dipped galvanized woven hardware cloth. TWP can also slit and cut this material to size. Further characteristics _____ of this zinc-coated steel mesh is provided on an information page. This mesh is also available in a superior galvanized grade _____. Similar mesh is available in S/S Welded _____.

price table comments: Prices are in U.S. dollars per roll. Rolls are 100 feet in length. Inquire about larger quantity pricing. Various warehouses and excellent freight programs are available.

ALTERNATIVE VIEW #1: NO LINK AVAILABLE YET
ALTERNATIVE VIEW #2: NO LINK AVAILABLE YET
DATA EXCEL SPREAD SHEET NAME: 002X002D041DATA
PRICING EXCEL SPREAD SHEET NAME: 002X002D041PRICES
DISK EXCEL SPREAD SHEET NAME:

Fig. 23                                        ⟋880

| NEW | FOLDER NAME | 004X004D025.HTML | ⟋882  ⟋884 |

| PAGE IDENTITY | .../004X004D025.html | DONT FILL THIS IN |

| CATEGORY | HOT DIPPED GALVANIZED WIRE MESH |
| DESCRIPTION | 4 MESH .025 Wire Diameter |
| PART NUMBER ○ | 004X004D025 |
| PRIMARY PHOTO I.D. NUMBER MVC | 251 |
| RULER SIZE | 3" x 2" |
| holes shown left to right | 12 |
| holes shown top to bottom | 8 |
| ABOVE PHOTO COMMENT | |
| ABOVE PHOTO COMMENT LINK | |
| comment done | no |

008X008G017      248
LINK TOO NEXT FINER WEAVE
IN THIS CATEGORY

LINK TO NEXT
HEAVIER WIRE DIAMETER
IN THIS CATEGORY                           LINK TO NEXT
004X004G035                                LIGHTER WIRE DIAMETER
               252                         IN THIS CATEGORY
                                           NO LINK
                                                        NONE

002X002D041
LINK TO NEXT COARSER WEAVE      253
IN THIS CATEGORY
                    COMMENTS

Pictured above is extra heavy commercial grade 4 mesh, 23 gauge, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

| price table comments | Prices are in U.S. dollars per roll. Rolls are 100 feet in length. Inquire about larger quantity pricing. Various warehouses and excellent freight programs are available. |

| ALTERNATIVE VIEW #1 | NO LINK AVAILABLE YET |
| ALTERNATIVE VIEW #2 | NO LINK AVAILABLE YET |
| DATA EXCEL SPREAD SHEET NAME | 004X004D025DATA | ☐ |
| PRICING EXCEL SPREAD SHEET NAME | 004X004D025PRICES | ☐ |
| DISK EXCEL SPREAD SHEET NAME | 004X004D025discs | ☐ |

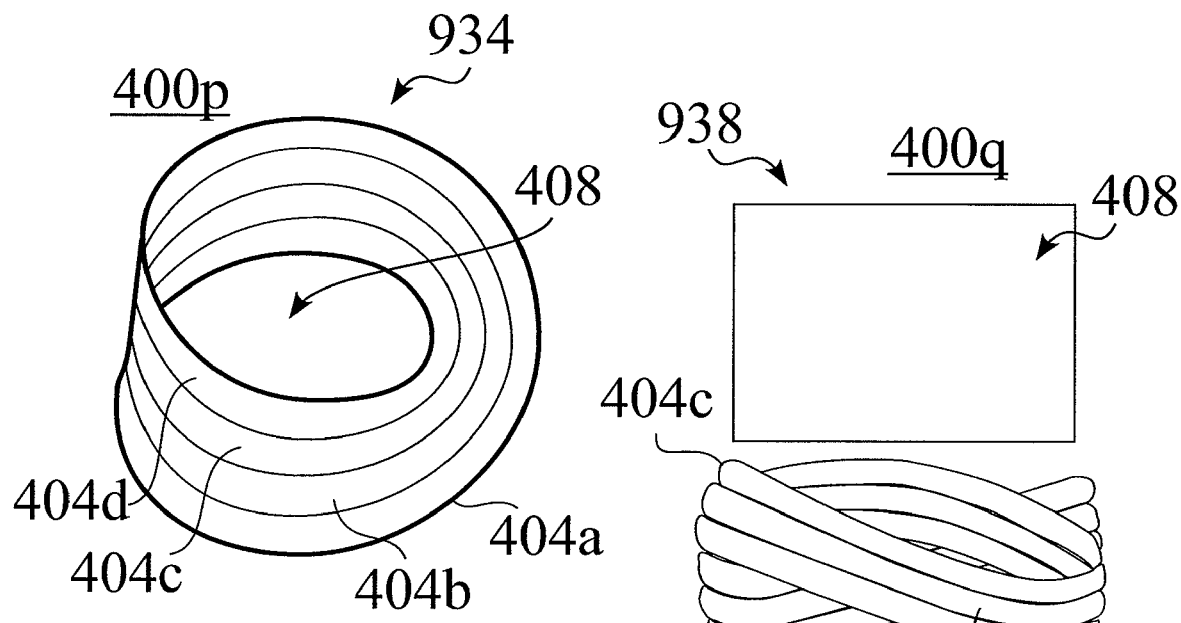
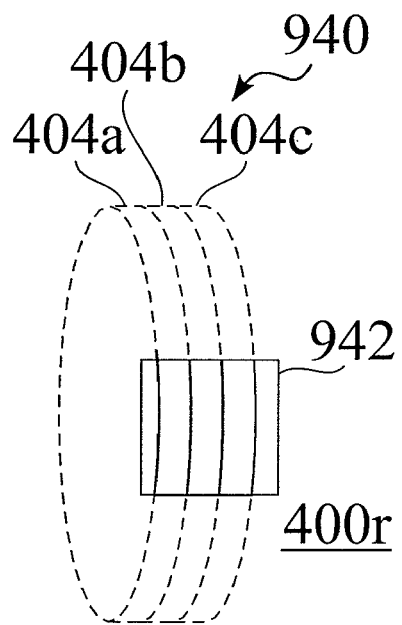
Fig. 31
Fig. 32
Fig. 33 Wheel on Side
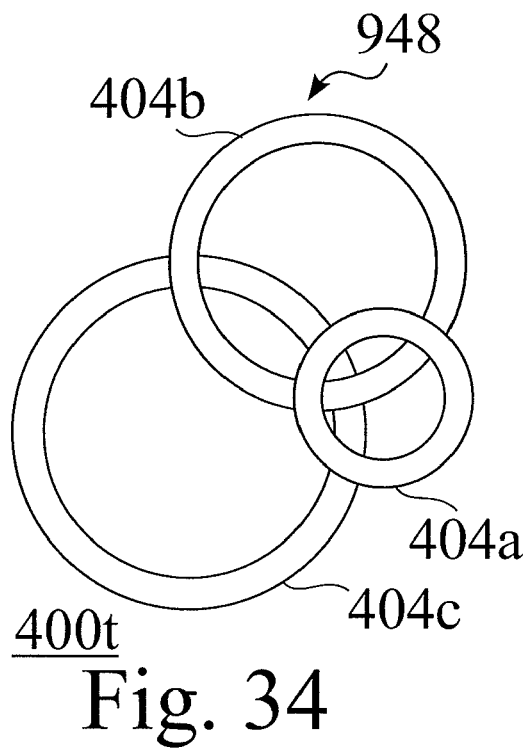
Fig. 34

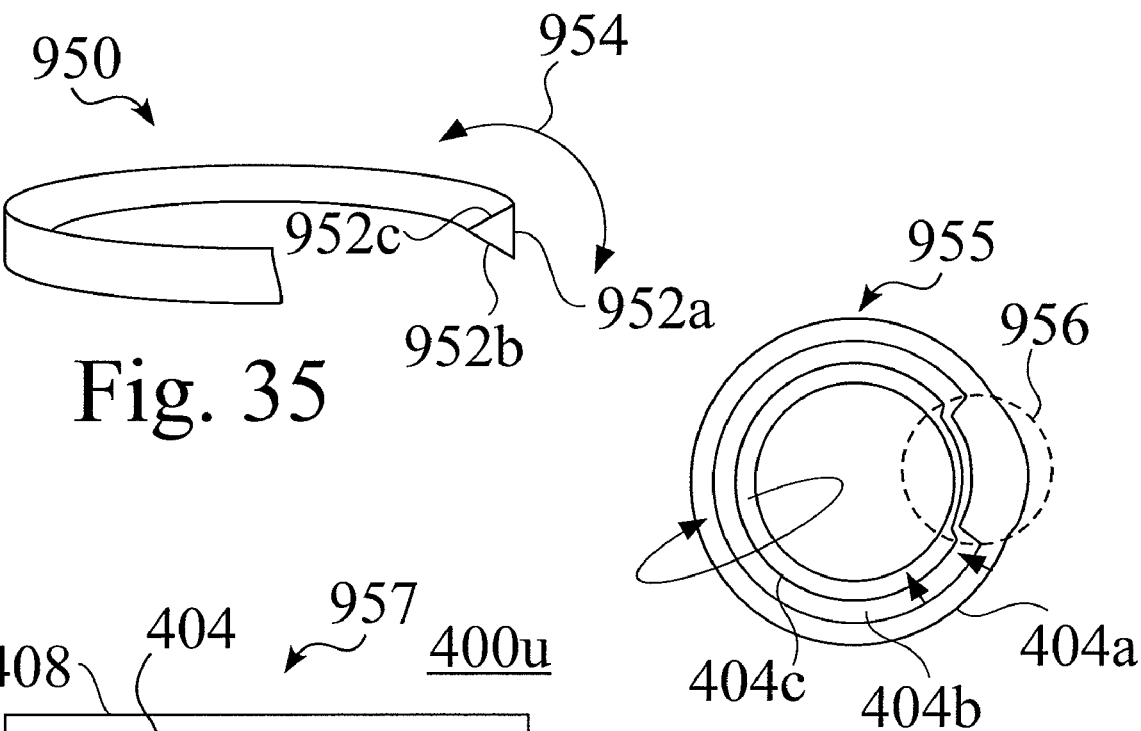
Fig. 35
Fig. 36
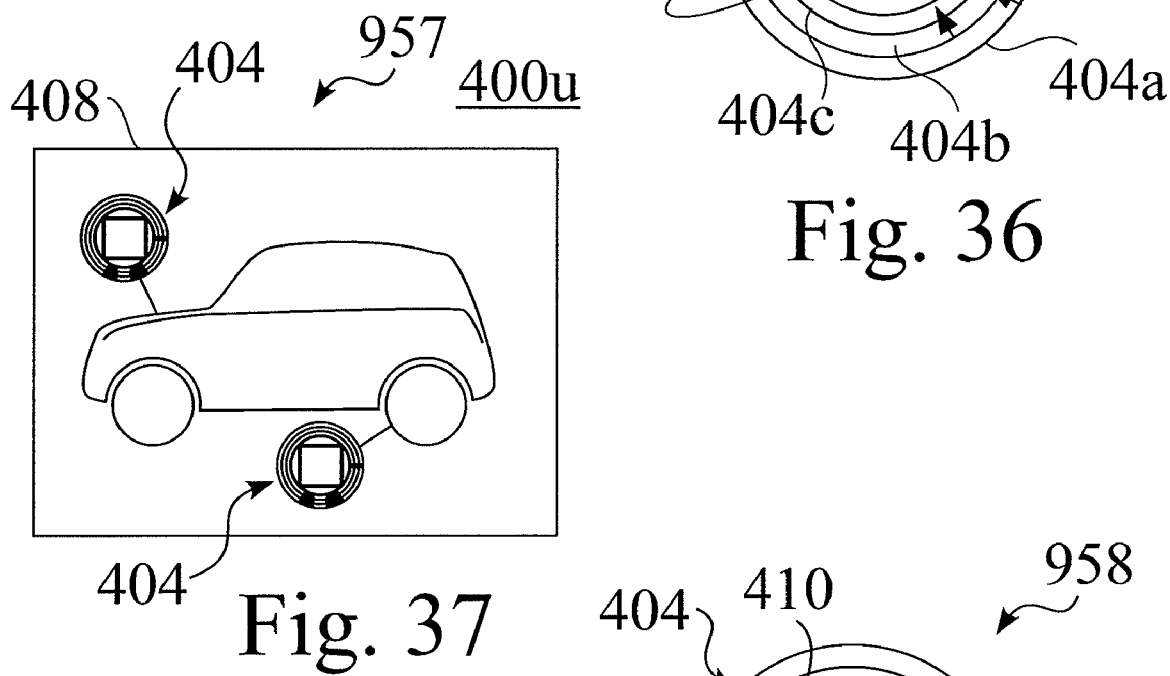
Fig. 37
Fig. 38
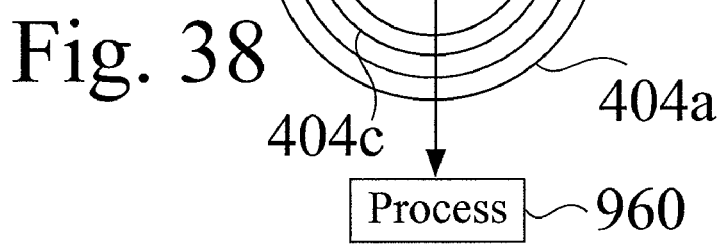

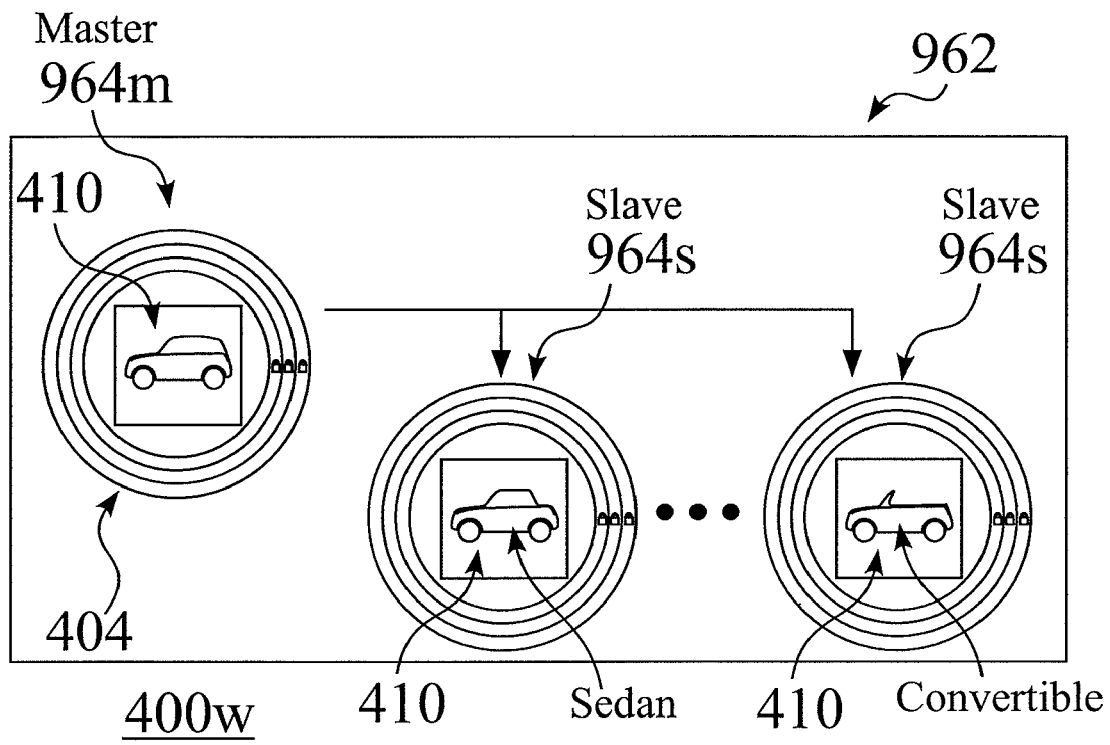
Fig. 39
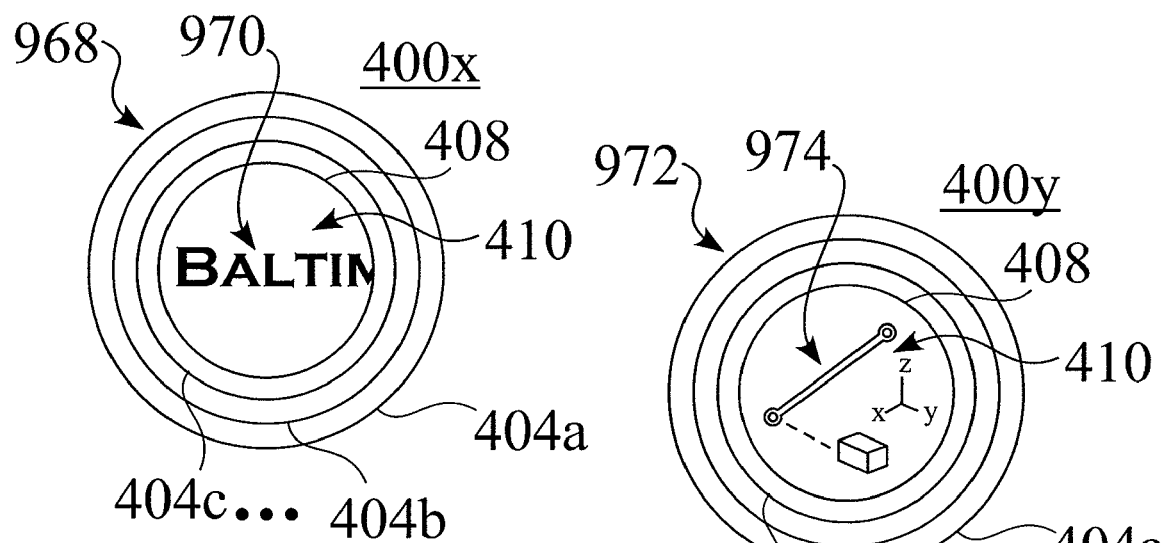
Fig. 40
Fig. 41

SELECTION INTERFACE SYSTEMS AND METHODS

CLAIM FOR PRIORITY TO RELATED APPLICATIONS

This application is a Continuation in Part of U.S. patent application Ser. No. 11/833,690, filed 3 Aug. 2007 now U.S. Pat. No. 7,861,179, which is a Continuation of U.S. patent application Ser. No. 10/444,329 filed 22 May 2003, issued as U.S. Pat. No. 7,254,785 on 7 Aug. 2007, which is a Continuation in Part application claiming priority from U.S. application Ser. No. 10/357,803, filed 3 Feb. 2003, issued as U.S. Pat. No. 7,207,013 on 17 Apr. 2007, which is a Continuation application claiming priority from U.S. application Ser. No. 09/507,474, filed on 17 Feb. 2000, issued as U.S. Pat. No. 6,552,739 on 22 Apr. 2003, each of which is incorporated herein in its entirety by this reference thereto.

BACKGROUND OF THE INVENTION

1. Technical Field

The present invention relates to selection interfaces. More specifically, the present invention relates to selection and display interfaces implemented on a computer or across a network, whereby a user can select and gain access to an image or other information related to an item or class of items having multiple properties.

2. Description of the Prior Art

The selection of products, parts, commodities, or other selectable items is commonly a laborious and time-consuming process, whereby a user or shopper is required to navigate and sort through numerous items that do not even remotely meet the user's requirements. For example, on a merchandising system implemented on a computer, e.g. through an Internet website, while a user may have an indication of one or more desired features of an item, the user is required to navigate through a large array of products, typically presented as lists of one or more items in a category. If a product name or brief description sounds remotely feasible, the user is then typically required to navigate to more detailed information regarding the item.

An exemplary product category, which presents a multitude of selection choices, is that of wire mesh products. Wire mesh and wire cloth come in many different combinations of weave, material, mesh sizes, and wire diameter. Although hundreds of thousands of different combinations are possible, it may not be practical for a particular supplier to offer all the combinations. Some combinations of weave, material, mesh sizes, and wire diameters are also not manufacturable, e.g., a wire diameter that is so large the mesh openings are closed up or impossible to weave.

Buyers can often make ordering mistakes in selecting a wire mesh or cloth because the impossible or unavailable combinations are sometimes too subtle to understand. Ordering the wrong thing can be frustrating for all those involved. The Internet now makes it possible for users to log onto a business' website to select and order products.

Suppliers like TWP, Inc. (Berkeley, Calif.) offer at least three families of mesh materials, e.g., woven wire mesh, welded stainless steel mesh, and galvanized hardware cloth. The woven wire mesh includes a range of traditional to ultrafine, high-tech alloy, screen materials. The welded stainless steel mesh is a strong, precise material with an accurate grid pattern and relatively large holes. The galvanized hardware cloth includes a range of steel mesh protected by a heavy-duty zinc coating, e.g., for use in outdoor and industrial environments. Such materials are conventionally stocked in 36-inch and 48-inch wide rolls in 100-foot lengths. But rolls up to 300-inches wide can be bought on special order.

Wire cloth is the proper name for what is commonly called screen mesh. Such material is known for its high strength, wear resistance, ability to withstand high temperatures, and long service life. Wire cloth is woven like textile cloth. So-called market grade wire cloth are woven wire meshes suitable for general purpose work.

Materials that can be used include stainless steel type 304, brass, or copper. A line of special woven meshes are available in stainless steel type 316, aluminum, bronze, inconel, nickel, steel, and epoxy-coated steel. The user's choice of metal is determined by the product-operation environment and constraining cost considerations.

The wire-mesh hole size, e.g., the distance between two adjacent parallel wires, is a function of both the mesh count and the wire diameter. Changing either will change the opening size. The usual opening sizes vary from one-inch openings down to microscopic. The choice of a wire-mesh opening size is determined by the desired sizes of objects to be retained or allowed to pass through. The mesh is the number of openings in a linear inch, measured from the center of one wire to a point one-inch distant.

Two weaves are conventionally available, plain and Dutch weave. The plain weave has an over-one/under-one weave. Such type of wire cloth has square or rectangular openings, and is the simplest and most common weave used in screening and separating applications. The Dutch weave is woven with two different wire sizes, to produce wedge shaped openings. Such weave is generally considered stronger than plain weave and is often used in filtration.

The typical welded stainless steel wire mesh is formed of wires that are fused together at their junctions onto a grid. Automatic welding machines are used that accurately position all the shorter (weft) wires over the longer (warp) wires and spot-weld the intersections. These special machines can produce strong, consistent welds without any burning or discoloration.

The standard welded-stainless-steel-wire-mesh material is type 304 stainless steel because of its high corrosion resistance and strength at elevated temperatures. Type 304 stainless steel is also referred to as "18-8", meaning eighteen percent chromium (18% Cr) and eight percent nickel (8% Ni). TWP, Inc. also provides stainless steel types 304L, 316, 316L and other stainless steel alloys on request.

Standard welded wire mesh openings are always square or rectangular, and range from 0.218 inch and 0.979 inch. Meshes from 4-mesh to 1-mesh are usually stocked, and much larger meshes with 10-inch openings and 0.500 inch wire diameter can be obtained on special order.

Galvanized hardware cloth is typically used in partitions, grills, vents, cages and guards, wherever economical, sturdy, corrosion-resistant material is required. Galvanized hardware cloth is a lightweight, economical steel mesh that is protected from atmospheric corrosion by the application of heavy duty zinc coating, e.g., hot-dip galvanizing. The zinc coating encapsulates the mesh for excellent corrosion protection and a firm, non-raveling product.

The hardware cloth openings are relatively large compared to those of woven mesh, e.g., they range from 0.108 inch to 0.459 inch. The galvanizing process slightly decreases the opening size by about 0.004-0.006 inches. Several special hardware cloth specifications called vent meshes offer larger open areas for increased air flow rates. Readily available galvanized hardware cloth is stocked in 2-mesh, 4-mesh, and 8-mesh. Other special meshes are manufactured as required.

The 2-mesh and 4-mesh is available woven or welded and the 8-mesh hardware cloth is woven.

There have been some basic purchasing and selection systems proposed in the prior art.

R. Burke, Computer System for Allowing a Consumer to Purchase Packaged Goods at Home, U.S. Pat. No. 6,304,855, describes "A system for generating images representative of a store shelf includes a retail space management system for generating information describing product and shelf sizes and locations in three dimensions, and including a code which is unique to each product. The products are typically commodity goods. A product database is used to store images of product packages which are accessible using codes unique to each product. A three-dimensional modeling and display system which takes size and location information from the retail space management system and generates three-dimensional models of each shelf and product and accesses the product database using the codes provided by the retail space management system to obtain images for each product. It generates a display of each product on each shelf by combining the obtained images and the generated three-dimensional models. The consumer may manipulate the display to change what is being viewed, to examine product packages and to purchase products."

M. Wilson, Full Alphanumeric Character Set Entry From a Very Limited Number of Key Buttons, U.S. Pat. No. 6,031,471 describes "A graphical machine-user interface includes a processor connected to a display screen to generate a screen display of individual items in groups together with the selector indication. The processor and a display screen are used to advantage to provide a rich keyboard function from a very limited set of pushbuttons. For example, five pushbuttons indicating "up", "right", "down", "left", and "middle" are recursively used to reduce a large two-dimensional matrix of item choices presented on the display to some subset, e.g., a top, right, bottom, left, or middle subset. If the reduction results in a choice of one, then that item is selected and output automatically. If the reduction results in a subset with more than one item, then a recursive process is used in which the selection process is repeated until the selected subset is reduced to a single item."

As well, there have been selection and control interfaces disclosed in the prior art for menu selection or feature control of consumer devices, such as for phone sets, digital music players, and for personal computer controls.

FIG. 1 is a schematic view of a telephone control interface 10, similar to BEOTALK™ telephone products, available through Bang & Olufsen, Inc. A plurality of feature buttons 12a-12e provide a selection of a parameter to be controlled on the device 18, while a control 14 and a go button 16 provide an interface to control a selected parameter, e.g. such as a headset volume control. A display 20 is provided, such as to indicate a control level. A supplementary display 22 may also be provided, such as to provide selection-sensitive information 24.

FIG. 2 is a schematic view of an interface 30 for a digital music player 32, similar to an interface of a portable iPod™ digital music player, available through Apple Computers, Inc., of Cupertino, Calif. A rotatable dial 38 and select button 40 allow selection 52a-52c within one or more menus and or submenus 50a-50j, such that a user can navigate and highlight play lists or other system menu items. In some operation modes, the dial 40 is used to adjust operation parameters, such as play volume. As a user navigates through the menus or controls operation parameters, a display 36 provides a graphic representation of the menus or control parameters. Other buttons 42,44,46,48 are typically provided, such as to navigate to the beginning or end of a song or play list.

A connectable USB-compatible PowerMate™ knob selector, available through Griffin Technology, Inc., comprises a knob that is used as an assignable controller in conjunction with a computer. The assignable knob selector is used in conjunction with internal software, such for controlling one or more parameters within an application, for shuttling between applications, and/or for controlling operating system parameters.

While graphic user interfaces and selection devices have provided basic means for selection for various devices, there is presently no interface and/or device which provides an integrated selection and display interface, whereby a user can quickly search, sort, and/or select. The development of such a system would be a major technological advance. Furthermore, there is currently no interface and/or selection device which provides an integrated selection and display interface, whereby a user can select and gain access to an image or other information related to a generic, i.e. available item/class of items having multiple properties, by which a most nearly matching item is selected from a universe of such items. The development of such a system would be a further technological advance.

SUMMARY OF THE INVENTION

A user selection interface system comprises one or more rotatable selectors linked to selectable characteristics, and a display linked to the selectors, for display of an image that corresponds to the selected characteristics. The interface is typically linked to a database comprising stored image and other information which corresponds to the selectable characteristics, whereby an image that corresponds to an item which meets a selected characteristic is retrieved and displayed. Information other than the image which corresponds to the selectable characteristics may also be retrieved and displayed. In some embodiments, the stored images comprise a single image, which matches all the selected characteristics. In alternate embodiments, the displayed image comprises a composite image that is based upon stored images which correspond to different selected characteristics. In some embodiments, the user selection interface comprises a graphic user interface. In alternate embodiments, the user selection interface comprises a mechanical interface. Some preferred embodiments of the user selection interface provide links for merchandising functions, such as for ordering, purchasing, inventories, and/or shipping.

BRIEF DESCRIPTION OF THE DRAWINGS

FIG. 21 is a diagram that represents a design form for a second product page

FIG. 22 is a diagram that represents a design form for a third product page;

FIG. 23 is a diagram that represents a design form for a fourth product page;

FIG. 31 is a schematic view of a selection interface system, wherein one or more feature selectors may a form of a mobius strip, such as to provide a large variety of selectable positions;

FIG. 32 is a schematic view of a selection interface system, wherein one or more feature selectors may preferably be interwoven or braided;

FIG. 33 is a schematic view of a selection interface system, wherein one or more feature selectors may preferably form wheels that are configured generally perpendicular to the user, such that the side of the feature selectors face the user;

FIG. 34 is a schematic view of a selection interface system, wherein a plurality of feature selectors turn on uncommon centers;

FIG. 35 is a partial cutaway view of a feature selector wheel for a selective interface system, wherein the feature selector wheel comprises a plurality of sides, which are rotatable to provide navigation and/or selection though different or related choices;

FIG. 36 is a partial cutaway view of a feature selector wheel for a selective interface system, wherein the feature selector may preferably be rearranged;

FIG. 37 is a partial cutaway view of a feature selector wheel for a selective interface system, wherein an image further comprises touch sensitivity;

FIG. 38 is a schematic view of a selection interface system, wherein an image or video output associated with the wheels may preferably be further connected to a process or task;

FIG. 39 is a schematic view of an alternate embodiment of a selection interface system, wherein multiple selection interfaces may preferably be synchronized, such that different versions of a resultant image may be saved;

FIG. 40 is a schematic view of an alternate embodiment of a selection interface system, wherein one or more feature selectors may control the characteristics of a typeface or font, the characteristics of one or more passages of text, or default styles that can later be selected by a user;

FIG. 41 is a schematic view of an alternate embodiment of a selection interface system, wherein one or more feature selectors control the properties, selection and/or arrangement of objects or articles in space, and/or relationships between objects;

DETAILED DESCRIPTION OF THE INVENTION

Figure 3:
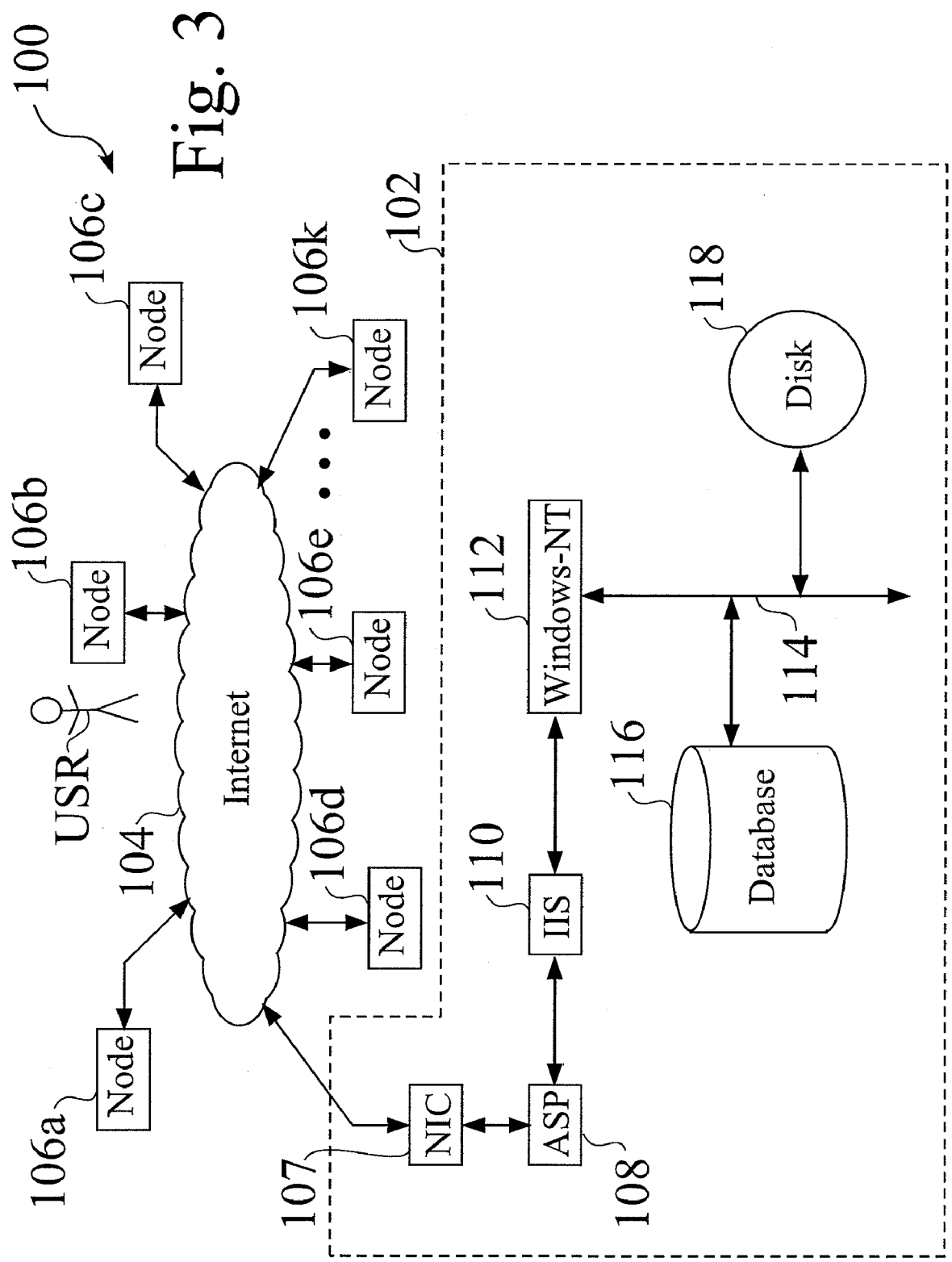
FIG. 3 is a functional block diagram of a selection and merchandising system, implemented across a network.

FIG. 3 illustrates an Internet wire-mesh merchandising system embodiment of the present invention, referred to herein by the reference number 100. The system 100 comprises a webserver 102 connected to the Internet 104 and many clients or shopper terminals, i.e. nodes 106a-106k associated with users USR. The web server 102 interfaces to the Internet 104 with a network interface controller (NIC) 107. An interactive webpage user interface 108 provides functionality similar to Microsoft Corporation (Redmond, Wash.) Active Server Pages (ASP). An Internet file and server 110, such as Microsoft Internet Information Server (IIS), runs under control of an operating system 112, e.g. such as Microsoft Windows-NT server. The ASP 108 and IIS 110 together generate a web presence on the Internet. An expansion bus 114 supports a database 116 and a general purpose storage disk 118. Various Microsoft Windows-NT services can run without requiring a user to be logged on to the system, e.g. Microsoft SQL Server, Microsoft Exchange Server, Dynamic Host Interface Protocol (DHCP), and even Windows Internet name Service (WINS) servers. These are preferably stored in disk 118.

The internet wire-mesh merchandising system 100 is readily adapted to a wide variety of networks, processors, and operation system environments, wherein information, such as a product image, is changed to reflect a current selection. For example, while some system embodiments 100 comprise HTML pages which are pulled in response to a selection, the Internet wire-mesh merchandising system 100 is readily integrated into other environments. Some current system structures pull, i.e. call, information from the database 116, such as through a job description in My SQL and PHP, wherein images are retrieved from an SQL database and are displayed in response to JAVA commands.

Figure 4:
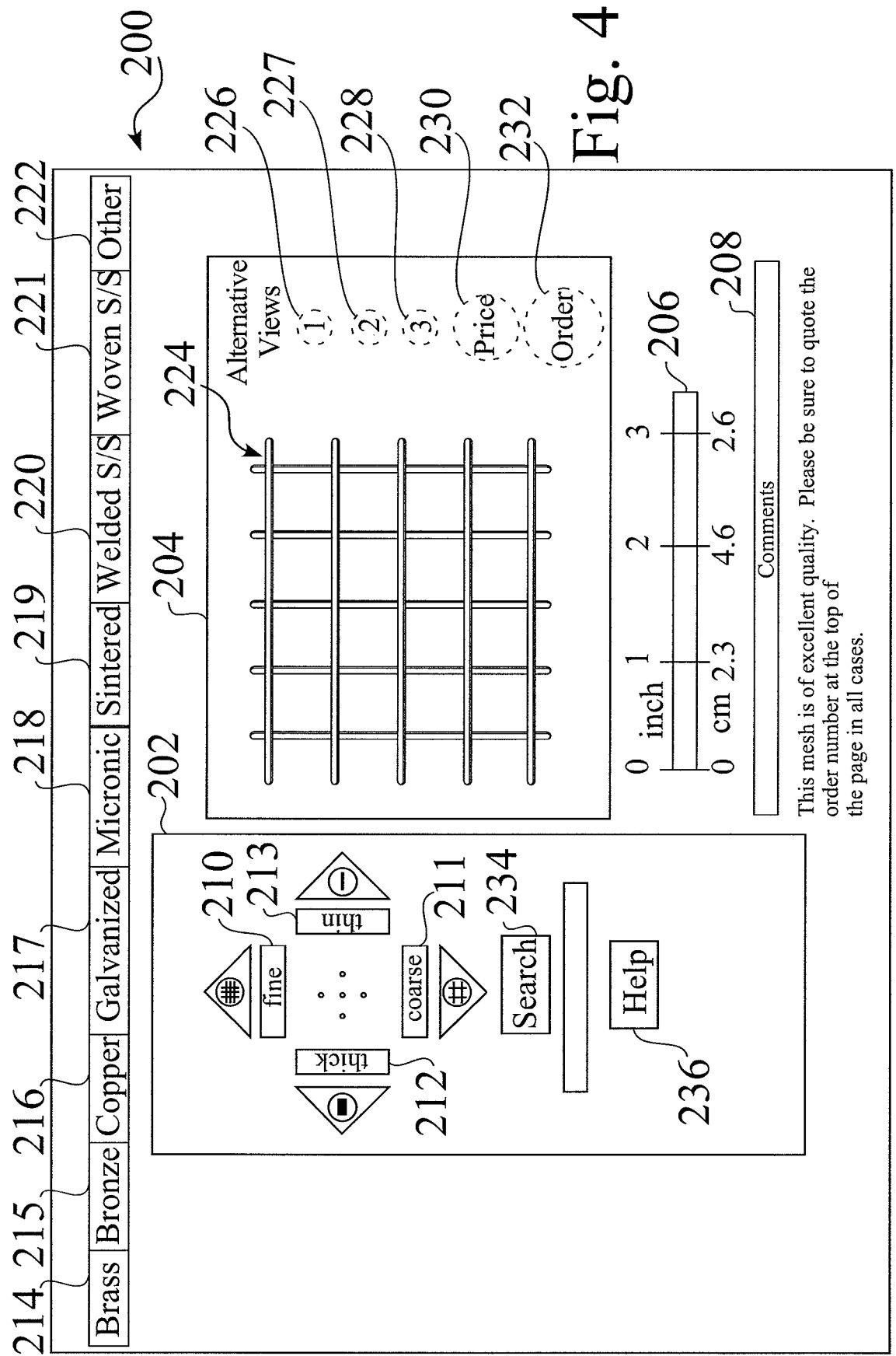
FIG. 4 is a diagram of a graphical user interface for a product page display on a web browser operated by a user at a network client site.

FIG. 4 represents a graphical user interface (GUI) 200 that is presented to an Internet user on a web browser, e.g. Netscape Communicator and Microsoft Internet Explorer. Such GUI is generated by the ASP 108 and IIS 110 (FIG. 3) when the user logs on to the uniform resource code (URL) address of the website operator. The GUI 200 typically comprises a navigation window 202, a sample-picture window 204, a ruler 206 for scale, and a comments field 208. The navigation window 202 permits the user to navigate through wire-mesh product samples that have finer mesh, coarser mesh, thicker wires, and thinner wires, e.g. by clicking on a set of hyperlink buttons 210-213, respectively. The material used in the wire-mesh product pictured in window 204 can be selected by clicking on any of the several buttons 214-222, e.g. such as brass 214, bronze 215, copper 216, galvanized 217, micronic 218, sintered 219, welded stainless steel (S/S) 220, woven stainless steel 221, and other materials 222. It may occur that meshes and wire sizes available in one material may not be available in another material. Amplifying remarks about the wire-mesh product currently selected are provided in the comments field 208.

The website design is such that the discrete products the user can view are those that the seller operating webserver 102 is offering for sale, or at least are those that the seller can actually produce and deliver.

The ruler 206 is a scale provided for the user to understand a picture 224 of a wire-mesh product being presented in window 204. Alternative views of the product, if available, can be accessed by clicking on a set of alternative view buttons 226-228. Such alternate views are presented instead of an initial sample product in picture 224. If a user is curious about the price of the product currently displayed in picture 224, a price button 230 is used to go to a webpage with current pricing. An order button 232 can be clicked-on to take the user to a product ordering webpage. A search button 234 and a help button 236 are provided for navigation help.

Figure 5:
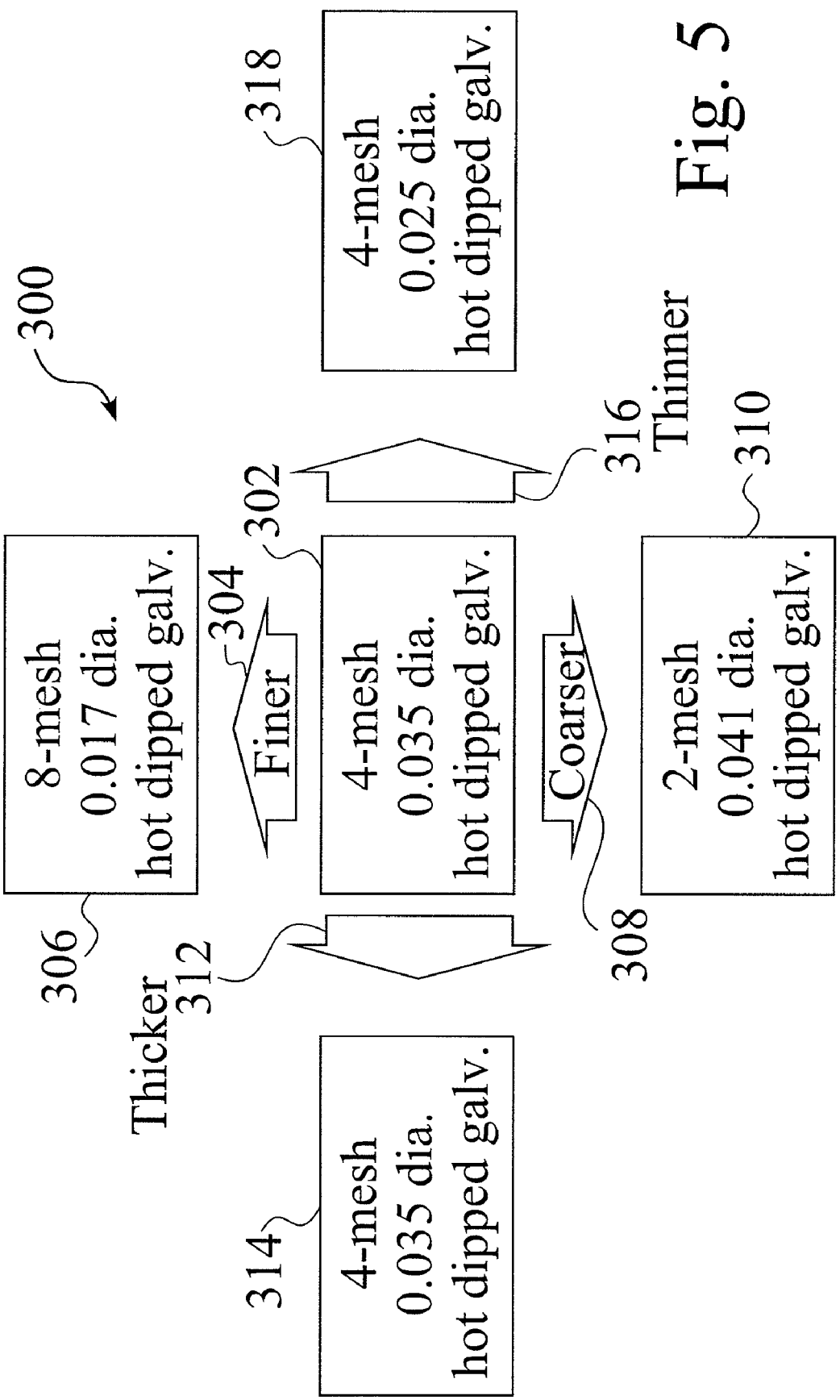
FIG. 5 is a flow diagram that represents the navigation that occurs between product pages as a result of a user clicking on any of four hyperlink buttons for finer, coarser, thicker, and thinner.

A dataflow 300 in FIG. 5 represents the effects of finer-mesh, coarser-mesh, thicker-wires, and thinner-wires hyperlink buttons 210-213 (FIG. 4). For example, a starting position 302 is for a hot-dipped galvanized 4×4 mesh with 0.035" diameter wire. A finer navigation direction 304 takes the user to a hot-dipped galvanized 8-mesh with 0.017" diameter wire in a position 306. Such represents the only choice for finer (higher count) mesh. A coarser navigation-direction 308 takes the user to a hot-dipped galvanized 2-mesh with 0.041" diameter wire in a position 310. Such represents the only choice for coarser mesh from a starting position 302. A thicker wire is not necessitated by requesting a coarser (lower count) mesh, but the thicker 0.041" represents the only product configuration the seller chooses to produce and sell. A thicker navigation-direction 312 points to a no-link position 314. Such occurs when there is no available product choice in that direction. A thinner navigation-direction 316 takes the user to a hot-dipped galvanized 4-mesh with 0.025" diameter wire in a position 318. Such represents the next choice for thinner-wire mesh from the starting position 302. The mesh count remains at 4-mesh.

In some system embodiments, the dataflow shown in FIG. 5 is used by a web designer to implementing the web server 102 (FIG. 3). Some detailed implementations further comprise webpage fill-in forms like those illustrated in FIGS. 20-23. A commercially marketed computer program sold by Filemaker, Inc., called FILEMAKER-PRO, provided good results for such forms.

Figure 6:
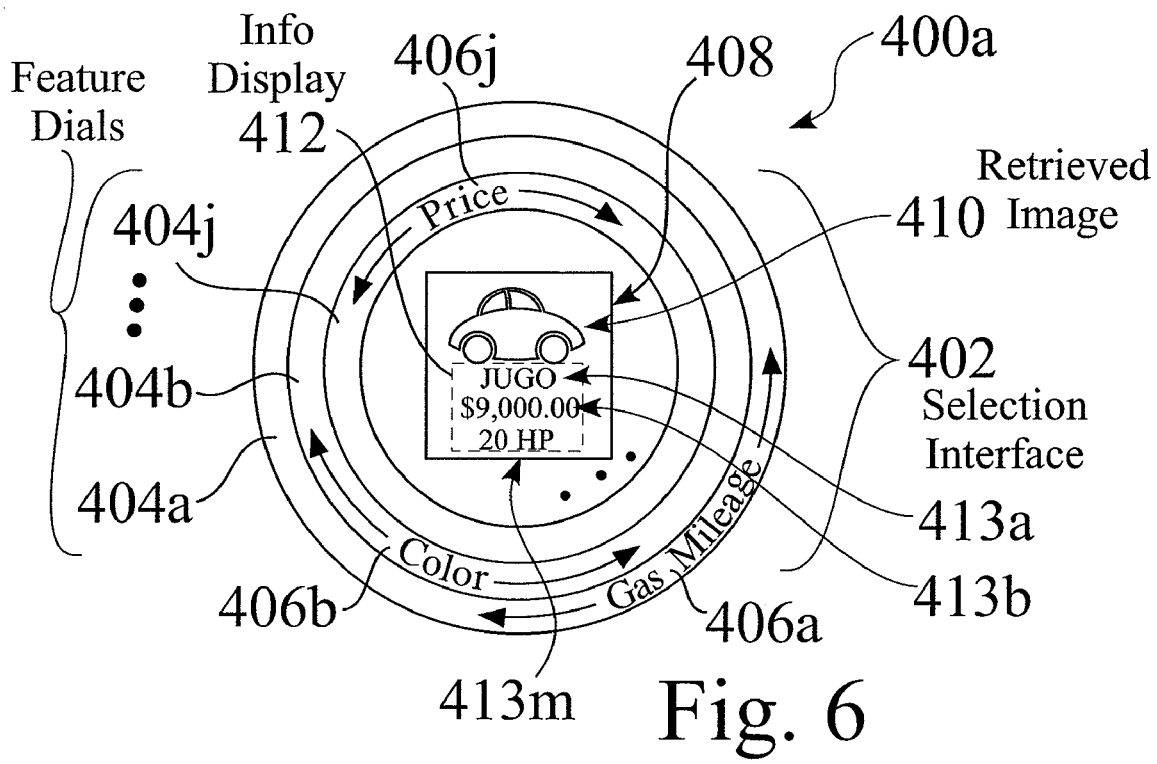
FIG. 6 is a schematic view of a dial selection and display interface.

User Selection Interface System. FIG. 6 is a schematic view of a dial selection and display interface system 400a. A plurality of feature dials 404a-404j are circular or orbital, i.e. they define a continuous selection path that proceeds about an axial center point, as with a rotatable tuning control or selector switch, either as a visual graphic user interface, e.g. such as within a web page, or alternately as a mechanical interface, e.g. such as on a dedicated device having a selection interface 400. Within the graphic user interface 400, a user can select and hold a dial 404, such as with a mouse or trackball, and move the dial 404 to incrementally change the selection 514 (FIG. 10), as well as the characteristics of the image 410.

Figure 10:
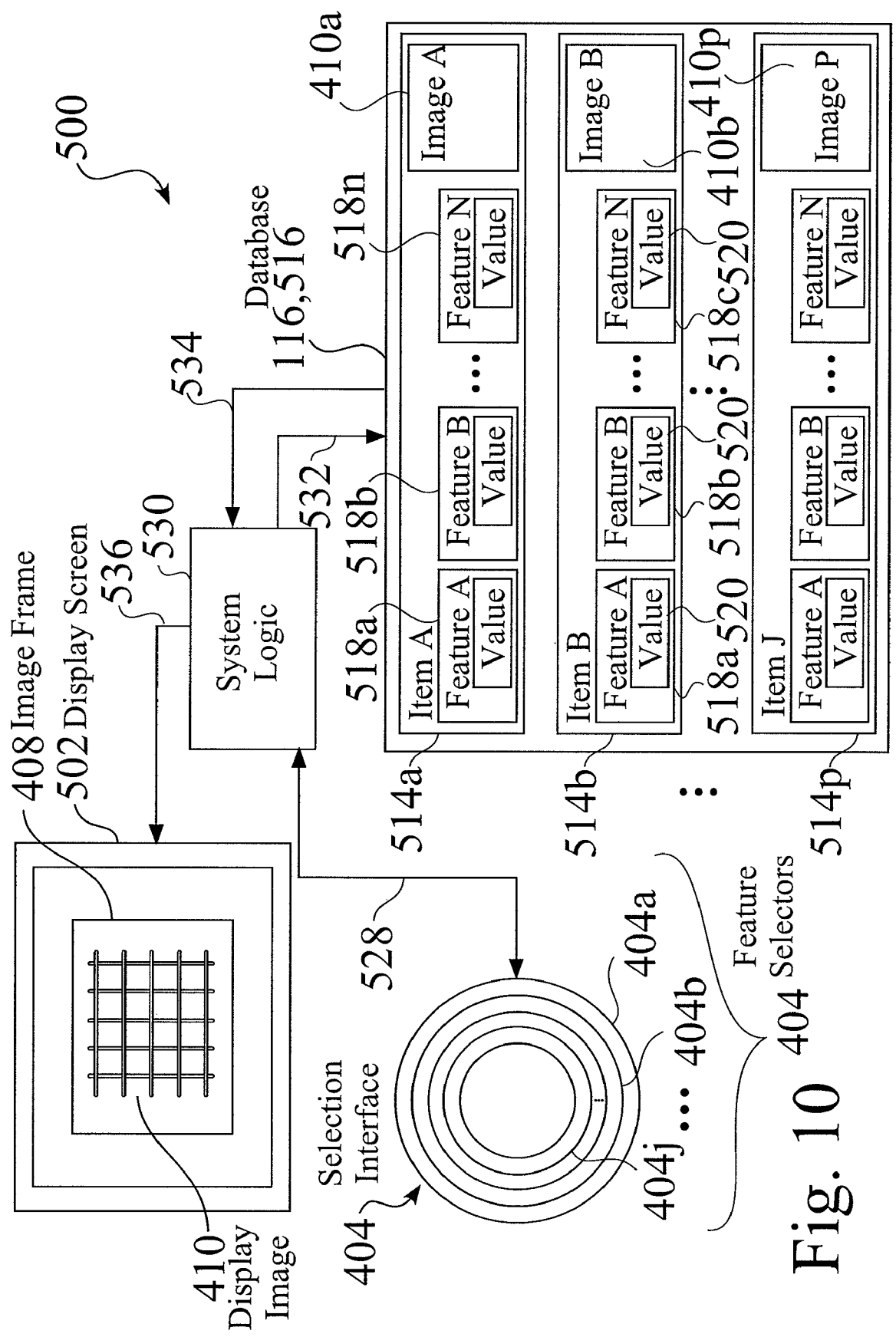
FIG. 10 is a functional block diagram of a selection interface system comprising storage, navigation, and display of items matching selected criteria.

The user selection interface system 400, such as 400a seen in FIG. 6, provides a powerful and intuitive interface, through which a user can quickly make one or more selections 514, from a universe of available items 514 (FIG. 10). An integrated display 408, such as to provide an image 410 and/or other information 413 for an available item 514, is preferably provided, such that a user may readily navigate to one or more desired items 514.

In some embodiments of the user selection interface 400, the dials 404 are controllable to adjust the speed or sensitivity by which different selections are queried and or displayed 410,412. For example, in a "fast dial" position, the search and display of available items 514 is performed with a high dial sensitivity, e.g. a small dial movement may yield the search and display of one or more new available items 514. Similarly, in a "slow dial" position, the search and display of available items 514 may be performed with a controllably slower or buffered dial sensitivity, e.g. a larger dial movement or a cease in dial movement may be required to search and display of one or more new available items 514. As well, the dials may further comprise a "tap" feature, whereby a tap motion in either dial rotation direction may automatically move the system to a next available item 514.

In some embodiments of the selection interface system 400, the dials 404, i.e. selection wheels 404, appear to rotate when selected and moved. In alternate embodiments of the selection interface system 400, the dials 404 simply appear as a ring at which a mouse 547 (FIG. 12) is pointed. As well, in some system embodiments, one or more dials 404 may directly correspond to a track ball, mouse, or other pointing device, such as to a dedicated mechanical dial. Furthermore, a touch screen display 510 may preferably provide a corresponding motion of dials 404 to the movement of a stylus or a finger. In alternate system embodiments 400, one or more dedicated devices with actual rotation selection wheels 404 are movable, such as with a finger or by other body motions.

In some embodiments of the selection interface system 400, two or more dials 404 can be locked together, so that their characteristics turn in unison. In some alternate system embodiments 400, one of the dials 404 is selectable to select, i.e. toggle the characteristics of the other wheels 404. For example, as a user turns the master wheel 404, a label on an inner wheel 404 changes functions, i.e. features 406, such as but not limited to transitions from color to shape, from shape to weight, or from weight to price.

As seen in FIG. 6, the selection dials 404a-404j correspond to a plurality of features 406a-406j, whereby a user can view, select, compare and/or purchase one or more items that match the selected features 406. For example, the features 406a-406j shown in FIG. 6 correspond to one or more vehicles 423 (FIG. 8), which meet gas mileage 406a, color 406b, and/or price 406j. A user U can readily move the dials 404, as desired, to navigate to a desired selection 514.

Figure 15:
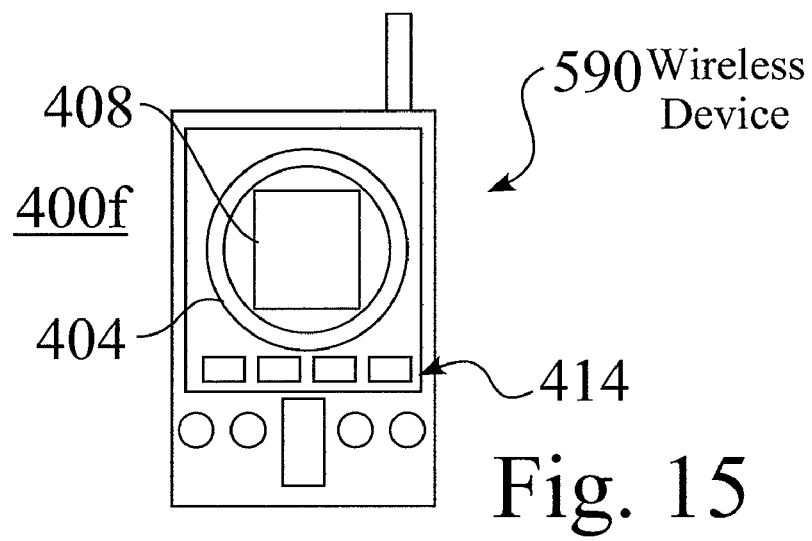
FIG. 15 is a schematic view of a remote device selection interface.

The wheels 404 or the buttons 414 of the GUI are readily implemented on wireless cell phone type devices, as well as kiosks 574 (FIG. 12), table tops 106 (FIG. 12), video games 600 (FIG. 16), machine control interfaces 610 (FIG. 17), or remote control devices 590 (FIG. 15). The image 410 that is shown may be either a static image 410 that is pulled from a database 116,516 of images 410, or a composite image 410 which is generated on the fly.

As seen in FIG. 6, the dial selection and display interface 400a also comprises a display window 408, whereby one or more images 410 that correspond to a selection 514 are displayed for a user U. Furthermore, other information 412 which corresponds to a selection 514 is also displayed, such as an item name 413a, a price 413b, and/or other information 413.

Figure 7:
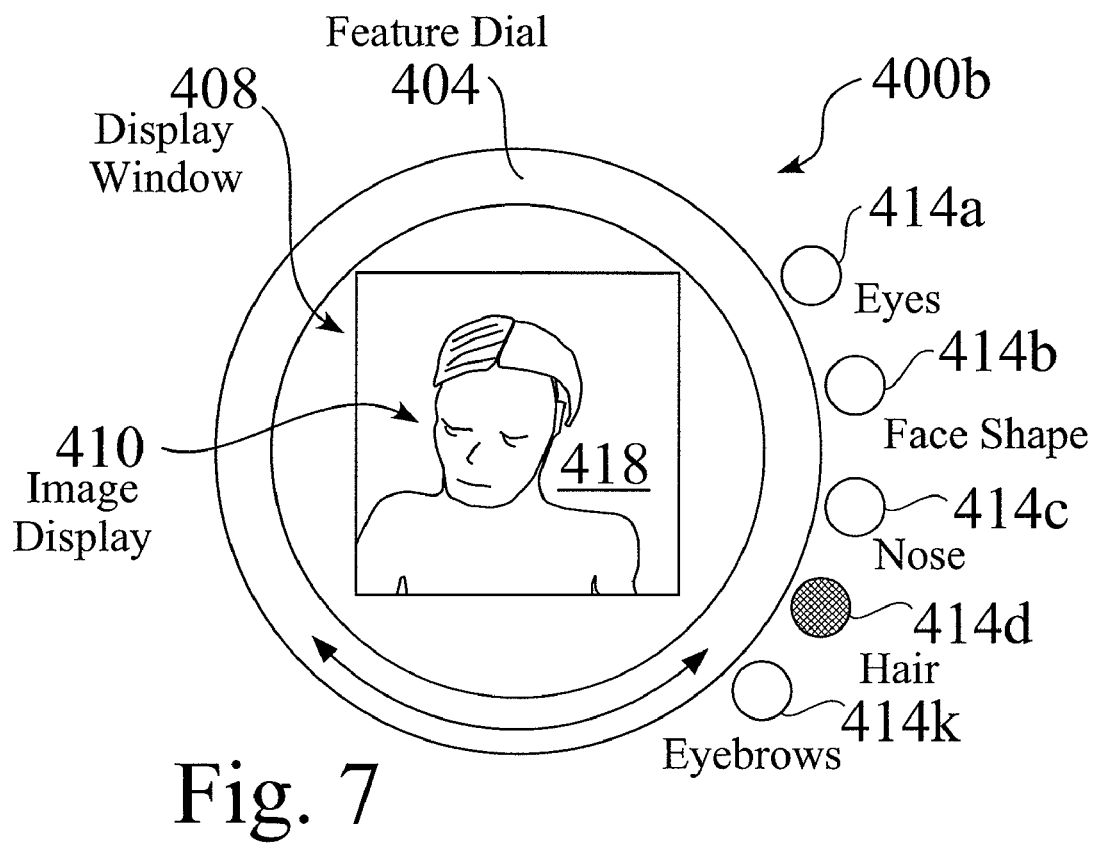
FIG. 7 is a schematic view of a dial selection and display interface having a plurality of dials.

FIG. 7 is a schematic view of a dial selection and display interface 400b, comprising a feature dial 404 and a plurality of feature toggles 414a-414b. The exemplary user selection interface 400b shown in FIG. 7 is implemented for composite human images 418, such as for facial composites. In use, one or more of the toggles 414a-414k within the selection interface 400b are typically activated, whereby the feature dial 404 becomes active to control a feature 406 (FIG. 6) that corresponds to an active toggle 414. For example, in FIG. 7, the hair toggle 414d is currently active, such that rotation of the dial 404 changes hair features 406 of the composite image 418. Similarly, activation of the face shape toggle 414b allows the dial to control a face shape feature 406 of the image 418. In alternate embodiments of the dial selection and display interface 400b, a toggle 414 can preferably cycle through a plurality of active features 406. As well, a feature sensitive dial label or icon may preferably appear on or near the feature dial 404, to indicate a currently active, i.e. selected, feature 406.

In a system embodiment 400b which provides a composite image 418, based upon user selections 404,414, selected feature values 520 (FIG. 10) are retrieved from a database 116, 516 (FIG. 10) and are composited to produce an image 418, such as by layering feature values 120, such as by opaque or translucent, i.e. sprite, layering. In an alternate embodiment 400b, features of known people, e.g. such as known criminals, are quantized and/or categorized and stored, such that as a user navigates through facial features, images of one or more people which match the feature set may be presented 418 within the display window 408.

Figure 8:
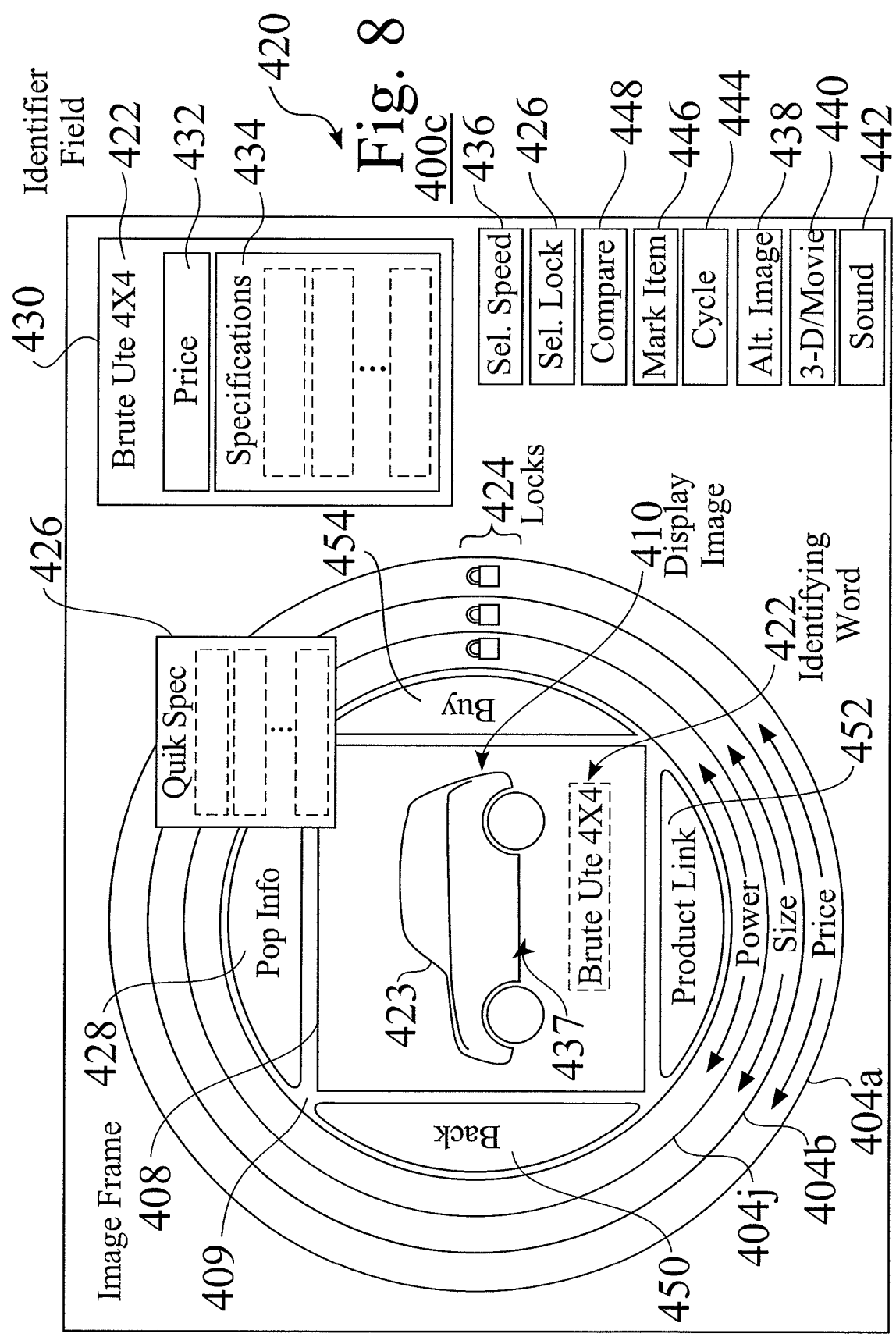
FIG. 8 is a detailed schematic view of a dial and display selection interface.
Figure 9:
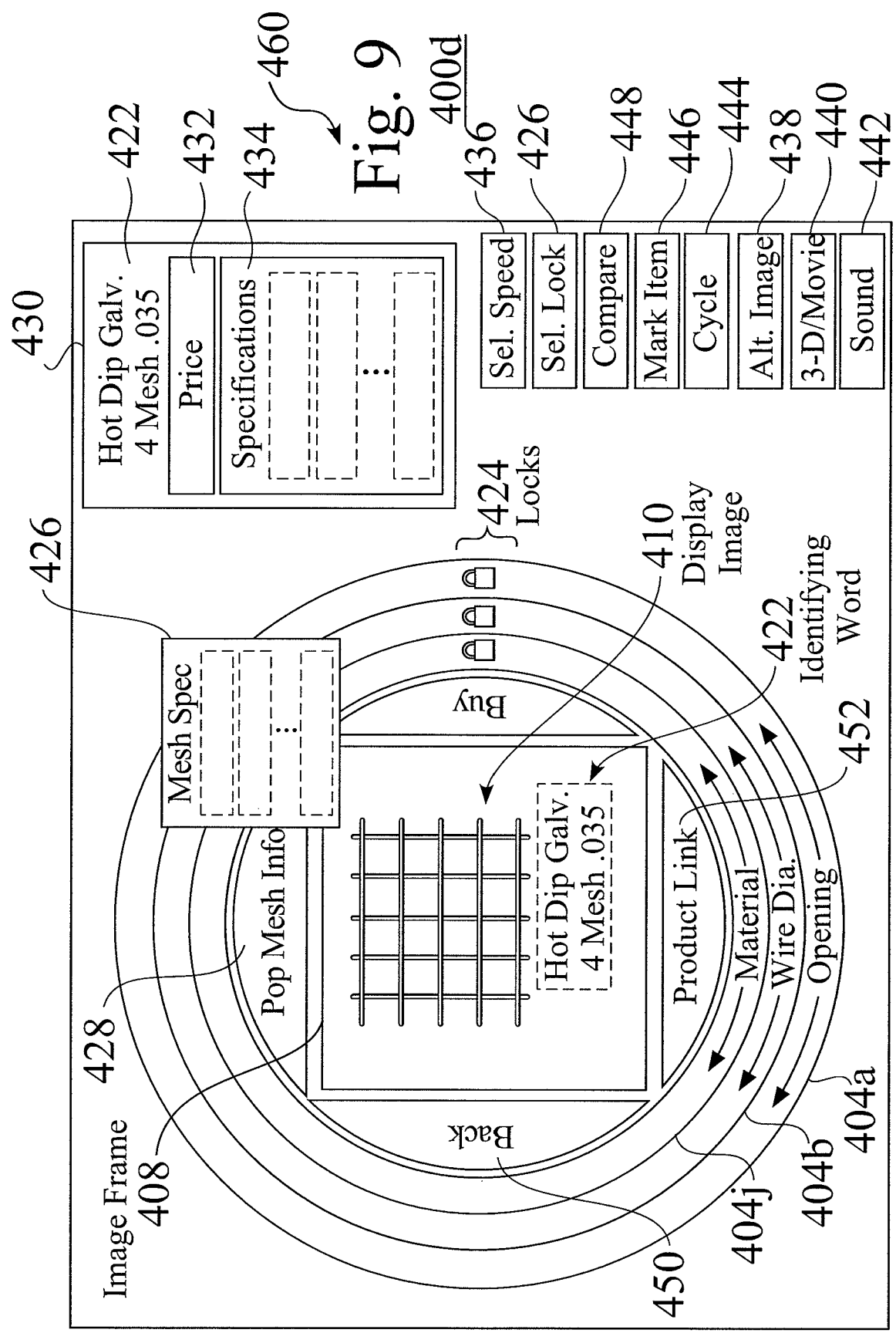
FIG. 9 is a detailed schematic view of an alternate dial and display wire mesh selection interface.

Detailed System Embodiments. FIG. 8 is a detailed schematic view of a dial and display selection interface system 400c. FIG. 9 is a detailed schematic view of an alternate dial and display wire mesh selection interface 400d. The selection interface systems 400c,400d are preferably implemented as a user interface implemented through a web browser, such as for selection, sales, and/or marketing across the Internet.

Figure 11:
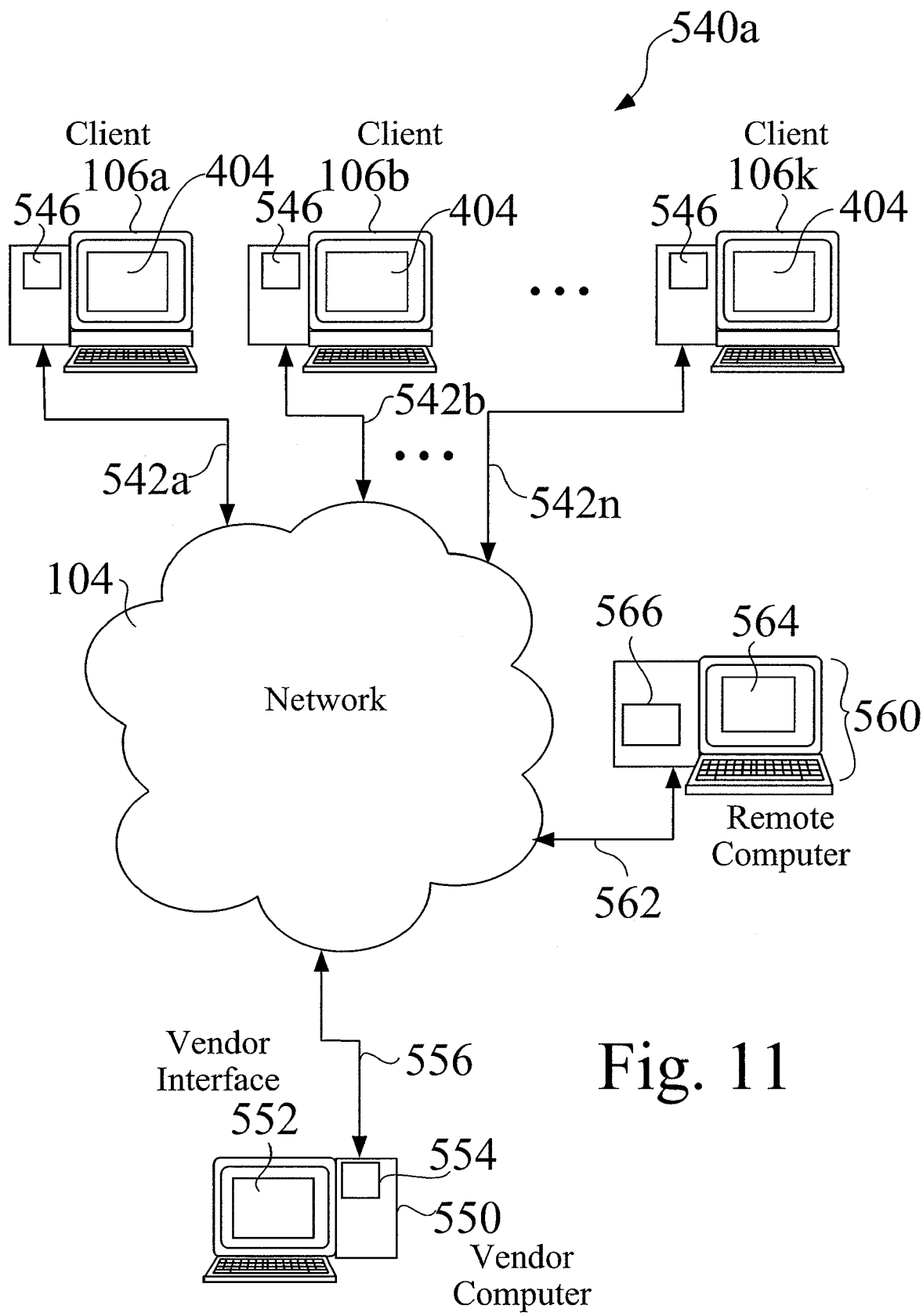
FIG. 11 is a schematic view of selection and merchandising system, implemented across a network on one or more client computers.
Figure 12:
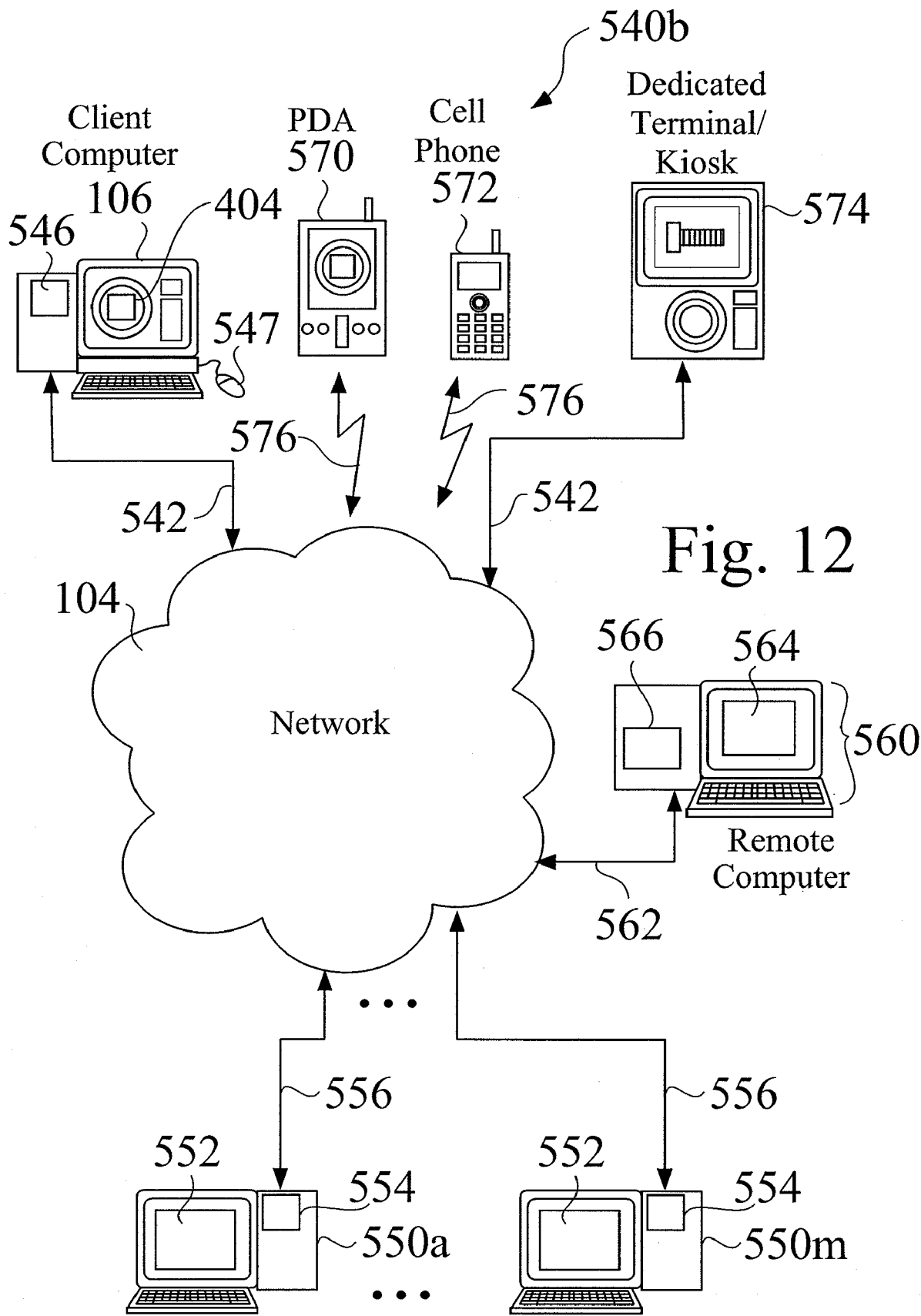
FIG. 12 is a schematic view of selection and merchandising system, implemented across a network on various client devices.

The exemplary dial and display selection interface system 400c shown in FIG. 8 provides an interface by which a user can readily browse through vehicle products 423. While some embodiments 400c are used for merchandising the vehicles 423 of one manufacture, such as through a single vendor computer 550 (FIG. 11), alternate system embodiments 400 are readily implemented to merchandise vehicles 423 from a variety of manufacturers, such as through a plurality of vendor computers 550a-550m and a remote, i.e. host computer 660 (FIG. 12).

As seen in FIG. 8, the dial and display selection interface system 400c comprises a plurality of feature dials 404a-404j, which are rotatable within the graphic user interface. The dials 404a-404j are adjustable to select from various items 514 (FIG. 10), e.g. such as vehicles 423, which meet desired selection parameters 406, e.g. price, power, and/or size. For example, a user may initially select vehicles 423 with a size parameter 406b, and may subsequently select from those vehicles 423 to find vehicles 423 which meet a price selection 406a. From the vehicles 423 which meet both size and price selections 406, the user may then adjust other selection dials 404, such as a power dial 404j, to select other desired characteristics 406.

The dial and display selection interface system 400c further comprises an image frame 408, such as within an inner region 409 defined within one or more concentric dials 404a-404j. A display image 410 is typically retrieved and displayed, whereby a user can see a photograph or illustration of a currently selected item 514. Other information 422 related to the current selection 514 may also be shown, such as embedded within the image frame 408, either as part of the image 410, or composited over the image 410. The embedded information 422 typically comprises one or more embedded words, such as a product name, a product number or code, or other item specifier 422.

As well, other information regarding the selected item 514 may readily be seen and/or accessed, such as through a quick specification window 426 or other field 426 near the image 410, e.g. either to appear automatically, as a user moves a mouse cursor 437 over the image 410, or to appear through a pop info control 428. For example, in the dial and display selection interface system 400d implemented for merchandising wire mesh products, an information button or glyph 428 is located near the image frame 408, such that activation reveals information about the a selected mesh.

Additionally, an information screen 430 may be provided, whereby information is readily displayed for the user, such as to display a product name 422, pricing information, 432, or other specifications 434. In some system embodiments, the information screen 430 appears once a selected item 514 is set, i.e. frozen.

As seen in FIG. 8 and FIG. 9, the dial and display selection interface systems 400c,400d preferably comprise a wide variety of selection enhancements. For example, selection locks 424 on one or more selection dials 404 allow a user to "lock" a selected parameter 406, such as price 406a, whereby only items which strictly meet a locked parameter 406 are presented to the user, while an unlocked parameter 406 may allow the system to approximate a parameter 406, based on available products 514.

In some system embodiments 400, a parameter which is not locked 424 is typically free to show all items 514 which meet the other controlled parameters 404,406. For example, in a system 400 for viewing criminal suspects, an unselected hairstyle feature allows the system to approximate any hair parameter 406, based on suspects who meet the other selected parameters 404,406. In some system embodiments 400, even if a user selects one hairstyle feature, an unlocked hair parameter 406 may allow the system to approximate a hair parameter 406, based on suspects who meet the other selected parameters 406.

In some system embodiments 400, locks 424 preferably provide either a hard lock 424, e.g. to rigidly specify a selection, or a soft lock 424, e.g. to specify an approximate lock 424. For example, in a soft lock condition 424, if a user selects "silver" as a color 506 of a vehicle 423 in a vehicle selection system 400c, the system 400c may show stock of similar "platinum metallic" or "gray pearl" colors, which may readily meet the user's needs. In a similar soft lock condition 424 of vehicle selection system 400c, a user selection of a price 506 may allow vehicles 423 which substantially meet a price selection 506, e.g. within a specified percentage or tolerance, to be displayed.

As seen in FIG. 8 and FIG. 9, the dial and display selection interface systems 400c,400d further comprise a selection speed control 436, to adjust the speed at which items are retrieved and displayed. A selection lock 426 allows a user to lock in a selected item 514, such as to freeze a selection 514 and corresponding image 410 for longer examination.

In some system embodiments 400, the images 410 light up, or highlight a purchase or shopping cart button 454, whereby a user may check stock, order, and/or purchase a selection 514. As well, a navigation button or product link 452 may be provided and preferably highlighted, whereby the user may navigate to other information either within a product section of the host site, or to a linked site. A back button 450 may also be provided, such as to toggle to previous selections 406 and/or selected items 514.

As seen in FIG. 8 and FIG. 9, the dial and display selection interface systems 400c,400d also preferably comprise mark item control 446, compare item control 448, and cycle items control 444, whereby a user can mark, compare, and/or toggle between selections 514. For example, in a motor vehicle selection site 400c, a user may want to compare features between three compact cars 514, either having the same or similar features 406, or having different selected features 506, e.g. the user may opt for a higher performance engine in one car 423, or a premium interior in another car 523, and then compare features.

Some embodiments of the dial and display selection interface systems 400c,400d also preferably comprise enhanced display and sound features, such as through alternate images 438, 3-D visualization or movie access 440, and/or through sound control 442. For example, through alternate images 438, a plurality of images 410 for a selected item 514 may be presented to a user, such as front, side, rear, and perspective views of a vehicle 423. Similarly, alternate images 410 of different items 514 which each meet the selection criteria may be cycled.

As well, before selection of parameters 406, the pictures 410 of a product section of a website may cycle through a series of images that relate only to products 514 in that section, e.g. such as a sequential display of different product lines for a manufacturer. For example, upon approaching a kiosk 574 (FIG. 12, FIG. 14), a user may be presented with a series of sequential images 410 of available items 514. In a selection system 400c for selection of vehicles 423, a sequence of product families may be presented, e.g. such as sub-compacts, intermediates, luxury, sports, pickup trucks, station wagons, and/or SUVs.

Some embodiments of the dial and display selection interface systems 400c,400d also preferably comprise access to three-dimensional display, animation, or movie clip 440, such as to provide a walk-around view of a product 514, to provide a walk-through of a building, or to access multimedia information regarding one or more product features. As well, sound access 440 preferably provides sound information, such as narrative information, music, or other sound data 440.

System Operation. FIG. 10 is a functional block diagram of a selection interface system 400, which comprises storage, navigation, and display of items matching selected criteria. The database 116, 516 shown in FIG. 10 is populated with selectable information corresponding to a plurality of items 514a-514p. Each item component 514 comprises one or more features 518a-518n, within which is assigned a corresponding value 120, and typically comprises one or more corresponding images 410a-410p. While the exemplary database 116, 516 shown in FIG. 10 is shown as a single database entity 116,516, the stored information can reside at one or more locations.

As seen in FIG. 10, a selection interface 404 comprises feature selectors 404a-404j, by which a user can readily navigate, select, view, compare and/or purchase items 514. As a user controls a feature selector 404, a selection signal 528 is sent to the system logic module 530. The database 116,516 is queried 532, to determine one or more items 514 which correspond to the combined selections 404a-404j. The results 534, which correspond to one or more matching items 514, comprise product information and images 410. which are returned 534 and displayed 536, either through the processor 530, or directly to the display screen 502. An image 410, such as 410a, is thereby displayed within the image frame 408.

While some system embodiments 100 comprise HTML pages which are pulled in response to a selection, the selection interface system 400 is readily integrated into other environments. Some current system structures pull, i.e. call, information from the database 116, 516 such as through a job description in My SQL and PHP, wherein images are retrieved from an SQL database 116,516 and are displayed in response to JAVA commands.

While the selection interface 404 shown in FIG. 10 is shown independently from the display screen 502, other embodiments of the user selection interface system 400 comprise an integral graphic user interface system 400, such as seen in FIG. 8 and FIG. 9.

Network Embodiments and System Administration. FIG. 11 is a schematic view of selection and merchandising system 540a, implemented across a network 104 on one or more client computers 106a-106k. FIG. 12 is a schematic view of selection and merchandising system 540*b*, implemented across a network 104 on various client devices, such as a computer 106, a wireless device 570, e.g. such as a personal digital assistant or a pocket PC, a cell phone 572, and/or a dedicated terminal or kiosk 574.

As seen in FIG. 11, a vendor computer 550 is connected to the network 104, and typically comprises a vendor interface 552 and vendor system module 554, such as to provide system operating software and/or database storage 116,516 (FIG. 10). Similarly, a remote computer 560 may also be connected to the network 104, comprising an administrative interface 564 and an administration module 564, such as to provide system operating software and/or database storage 116,516 (FIG. 10), either in conjunction to a vendor computer 550, or as a central administrator for multiple vendors 550.

A vendor interface 552 and computer 550 allows a vendor user to input item information, such as items 514, features 518, and feature values 520, as well as images 410, identifying words 422 (FIG. 8; FIG. 9), or other information 432 (FIG. 8; FIG. 9).

As seen in FIG. 11 and FIG. 12, while some embodiments of the selective interface system 400 are used for merchandising the items 514 of one manufacture, e.g. such as through a single vendor computer 550, alternate system embodiments 400 are readily implemented to merchandise items 514 from a variety of manufacturers, such as through a plurality of vendor computers 550, either in collaboration, or in conjunction with a remote computer 560. For example, the remote computer 560 shown in FIG. 12 may preferably be configured to as a host computer 560, to provide a merchandising and comparison interface 404 for client computers 106.

In a typical implementation of the dial and display selection interface system 400*c*, a home page comprises a main picture 410, which changes sequentially, through a group of pre-selected images 410. These images typically reside in a folder of images 410 that are currently used on the website. The unique image names 410 are typically chosen by a Webmaster, in advance of display to a website visitor, through a vendor interface 552 or a website administration interface 564, so that just the chosen images 410 are displayed. The images 410, as well as supplementary information, are displayable to either a vendor user or and administrative user, such as to display information that is similar to that viewed by a client user, or to display information that is unique to a vendor user, such as but not limited to inventory values, profit margin information, bill of materials information, parts lists, and/or subassembly information.

The selection interface system 400 is readily adapted to a wide variety of networks, processors, and operation system environments, wherein information, such as a product image 410, is changed to reflect a current selection. For example, while some system embodiments 400 comprise HTML pages which are pulled in response to a selection, the selection interface system 400 is readily integrated into other environments. Some current system structures pull, i.e. call, information from the database 116,516 such as through a job description in My SQL and PHP, wherein images 410 are retrieved from an SQL database and are displayed in response to JAVA commands, such that the image 410 is changed, i.e. updated, in response to the selective controls 404.

Figure 13:
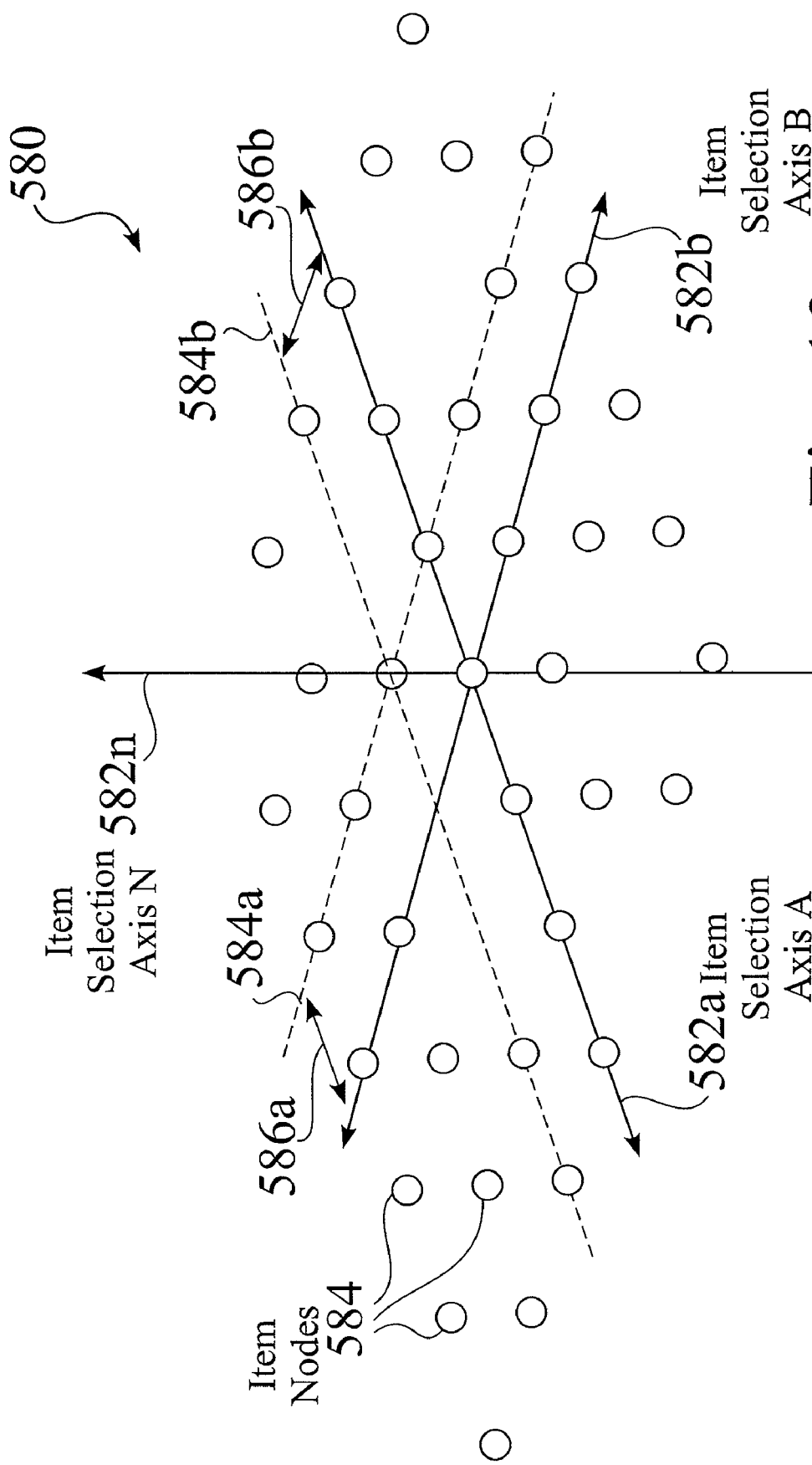
FIG. 13 is a perspective view of selectable nodes on a plurality of selection axes.

Item Selection Axes and Nodes. FIG. 13 is a perspective schematic view 580 of selectable nodes 584 on a plurality of selection axes 582*a*-582*n*. Within the user selection system 400, a user may quickly navigate and select one or more items 514 from a large plurality, i.e. a universe, of items 514, as represented by nodes 584 in FIG. 13. Selection dials 404 provide control on one or more selection axes 582, such as between product values 520 for features 518 (FIG. 10). The nodes 584 are separated 586, e.g. such as by 586*a* or 586*b*, such that a user is typically limited to select between node values 584, i.e. available feature values 120.

For example, in a wire mesh merchandising system 400*d* (FIG. 9), mesh values per inch are typically limited to either currently available meshes, or, upon special order, manufacturable meshes. Therefore, mesh values which are not manufacturable, or are not currently available, do not appear as a valid node 584. Through subsequent selection and control of selection dials 404, a user may quickly navigate to a mesh product which meets the needs of an end user and is also available or manufacturable.

Alternate Interfaces. While several embodiments of the selection interface system 400 are integrated within a client network environment, alternate embodiments of the selection interface system 400 provide an enhanced selection interface for a variety of networked and stand-alone applications. Furthermore, while some embodiments of the selection interface system 400 comprise a graphic user interface 404, alternate embodiments combine mechanical selection controls 404 with a display 408.

Figure 14:
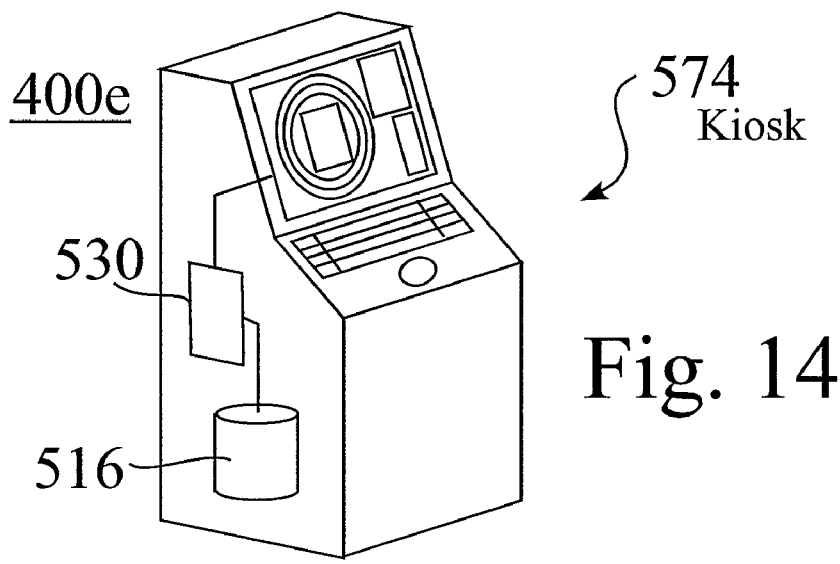
FIG. 14 is a schematic view of a stand-alone selection interface.

FIG. 14 is a schematic view of a kiosk 574 comprising a selection interface system 400*e*, which can either be networked 104, as seen in FIG. 12, or can function as an independent selection kiosk 574, with an internal processor 530 and database 516 e.g. such as for a store, a shopping center, a convention or a vending machine. In alternate kiosk embodiments 574, stored item, product, entity, or commodity information is updated periodically, such as to serve a point of service kiosk, e.g. such as for a store, a shopping center, or a convention.

FIG. 15 is a schematic view of a selection interface system 400*f* implemented on a wireless device 590, comprising a selection dial 404, feature toggles 414, and an integral display 408. The wireless device selection interface system 400*f* is readily adapted for a wide variety of applications. For example, a user may quickly search for and select a restaurant while traveling, e.g. by subsequently controlling toggles 414 for location, business, restaurant type, hours, budget, reviews, whereby the display 408 may suitably provide images of a map, restaurant logo, and/or review information.

Figure 16:
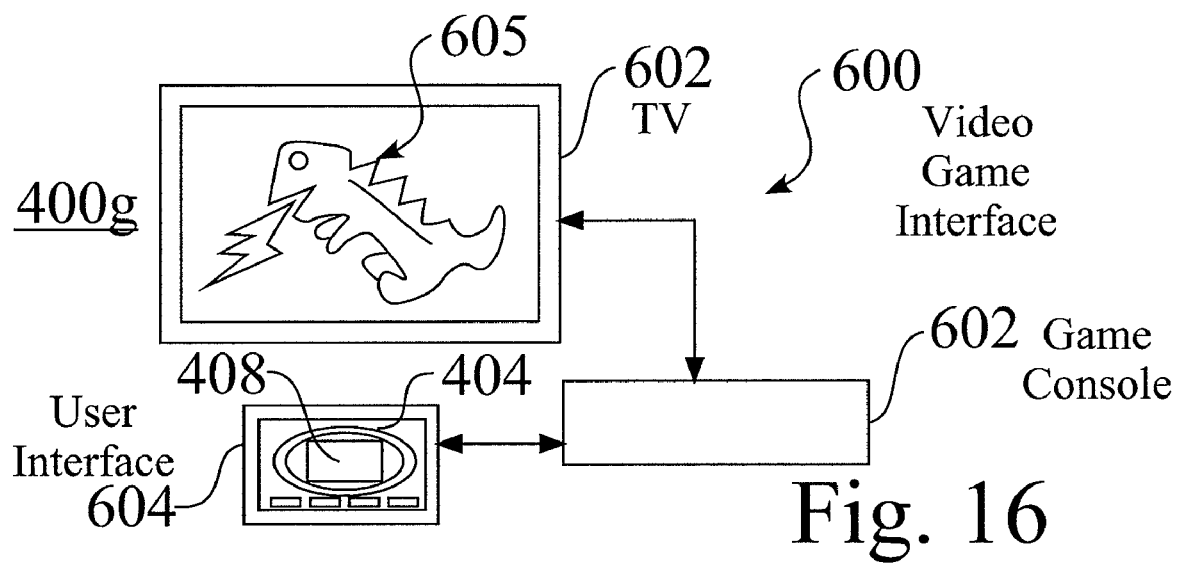
FIG. 16 is a schematic view of a game device selection interface.

FIG. 16 is a schematic view of a selection interface system 400*g* implemented on a game device 600, in which a user game interface 604 selects and controls game functions, such as through a game console 602 and a television display 602. As well, the selection interface system 400*g* may comprise a graphic user interface 404 (FIG. 10) on the display 602, for selection purposes within or peripherally to a game 605.

Figure 17:
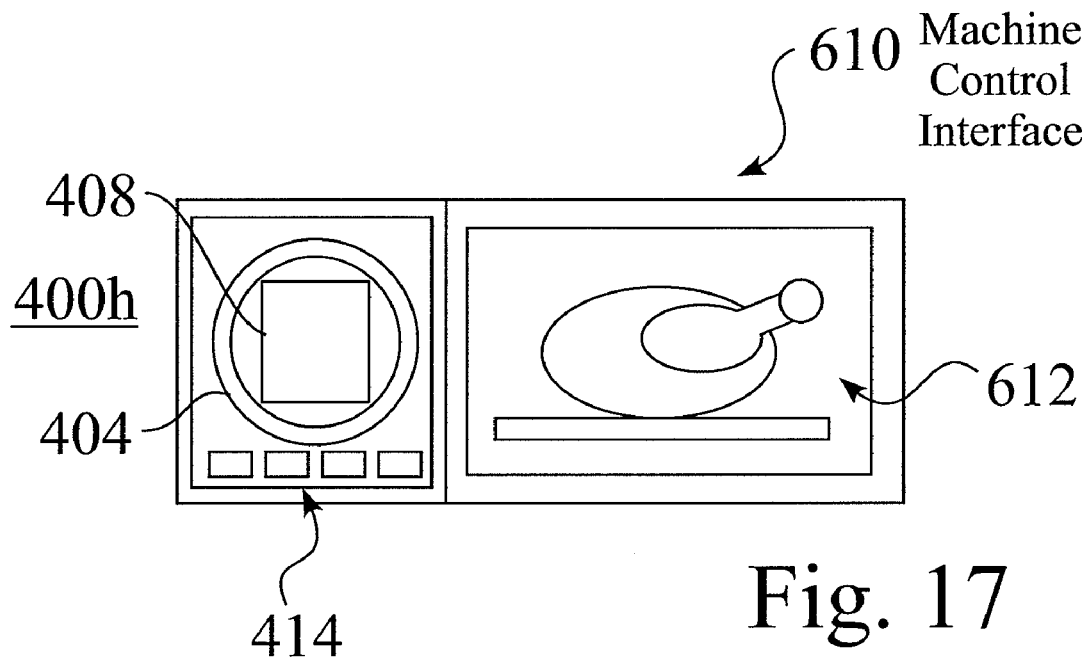
FIG. 17 is a schematic view of a machine control interface.

FIG. 17 is a schematic view of a selection interface system 400*h* implemented for a machine control interface 610, comprising a selection dial 404, feature toggles 414, and an integral display 408. The wireless device selection interface system 400*f* is readily adapted for a wide variety of control applications, such as for home appliances, for business machines, or for industrial applications.

Figure 18:
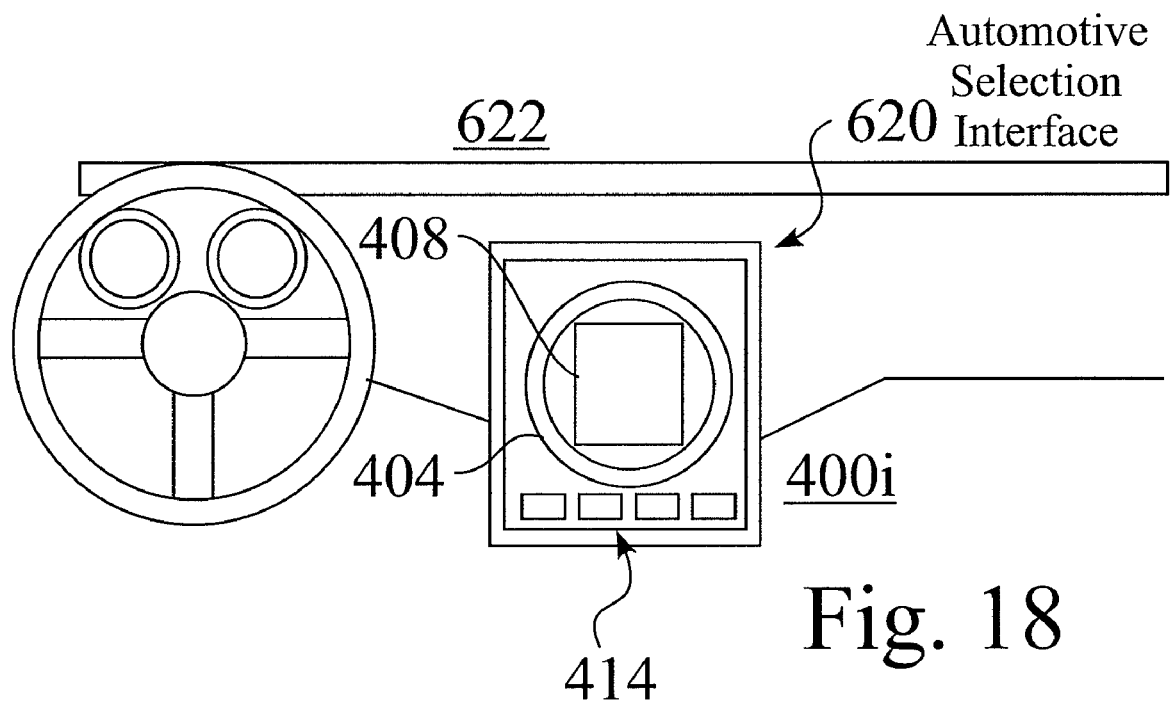
FIG. 18 is a schematic view of a dial and display system implemented in an automobile, such as for navigation selection and display.

FIG. 18 is a schematic view of selection interface system 400*i* implemented for an automobile 622, such as for navigation selection and display, comprising a selection dial 404, feature toggles 414, and an integral display 408. The automotive selection interface system 400*i* is readily adapted for a wide variety of automotive chores, such as for music selection, navigation, engine monitoring, security, and/or HVAC control functions.

Sample System Applications. The selection interface system 400*i* can be used for a wide variety of applications, and is ideally suited for environments in which a user desires to make a selection from a large plurality of items and properties, such as but not limited to parts, components, assemblies, consumer goods, transportation, electronics, or materials. A user may readily select and gain access to an image 410 or other information 412, 422,432,434 related to a generic, i.e. available item/class of items 514 having multiple properties, by which a most nearly matching item is selected from a universe of such items 514.

The selection interface system 400 allows a user to quickly navigate to a selection of one or more items 514, which most closely meet the desired parameters 406, without wasting time with items 514 which do not meet the desired parameters, while avoiding a specification of an item, such as a product, part, material, or commodity, which is not "available" or possible, i.e. not currently manufactured, not in stock, and/or is not a feasible selection.

Furthermore, as described above, the selection interface system 400i readily provides a composite selection interface, such as for profiling, animation, architecture, or modeling, wherein portions of an image 410 are retrieved and displayed, in response to user selections 406.

As well, the selection interface system 400i may readily be enhanced by front-end or back-end systems. For example, an introductory screen on a vehicle merchandising system can determine the class of vehicle to be selected. Similarly, a back-end enhancement in a vehicle selection system may provide a product link, a shopping cart function, or a list of local suppliers.

Figure 19:
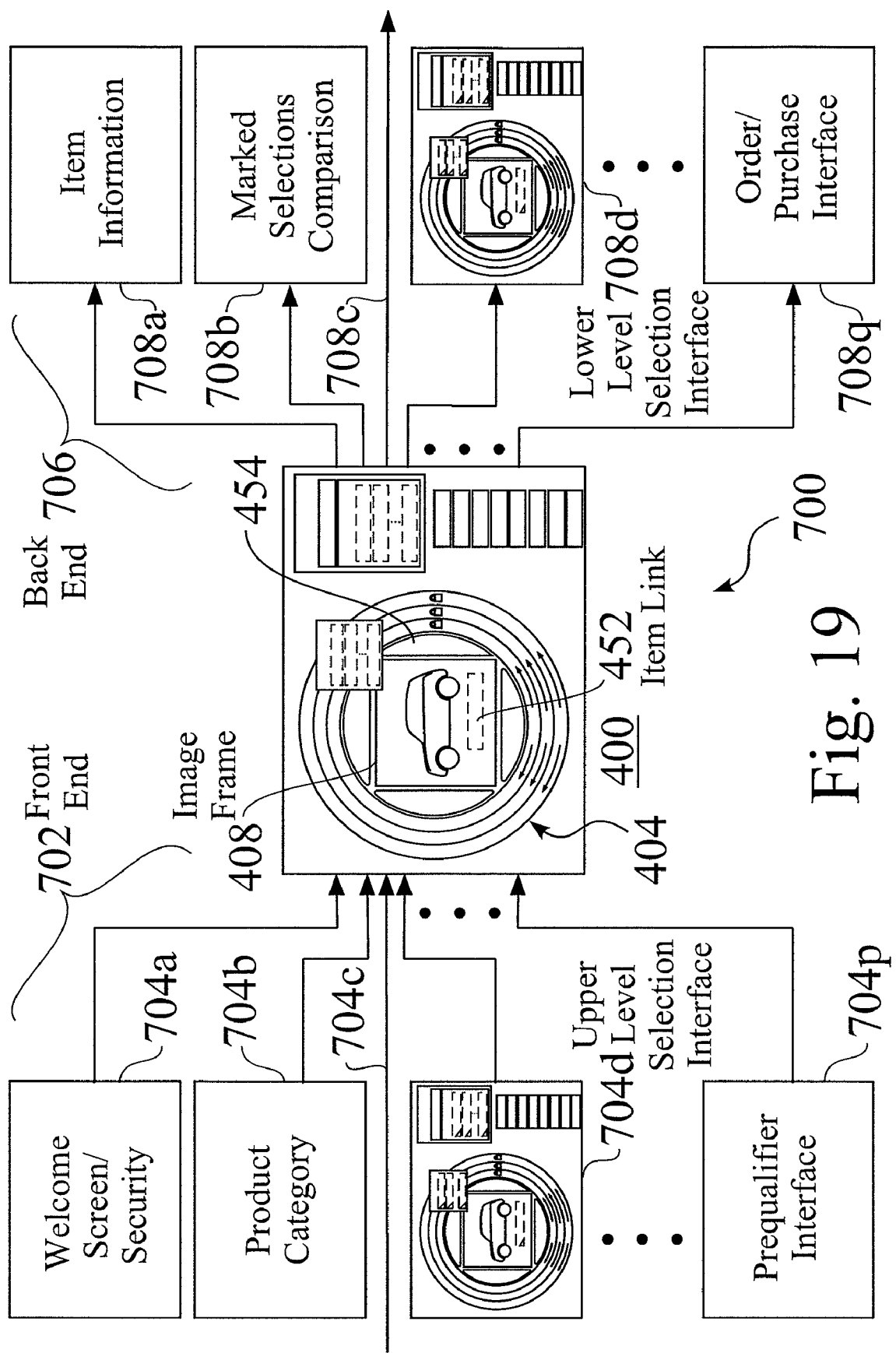
FIG. 19 is a schematic view which shows an exemplary front end and back end to a selective interface system.

FIG. 19 is a schematic view 700 which shows an exemplary front end 702 and back end 706 to a selective interface system 400. As seen in FIG. 19, the selective interface system 400 is readily accessed at a client computer 106, e.g. 106a (FIG. 11), either directly 704c, or through a wide variety of linked pages 704a-704p. For example, the central selective interface system 400 shown in FIG. 19 is accessible through a welcome/security log-in screen 704a, a product category selection screen 704b, a direct link 704c, an upper level selection interface 704d, or a pre-qualification interface 704p.

Similarly, the selective interface system 400 preferably further comprises a selectable back end 706, either directly 708c, to a wide variety of linked pages 708a-708q. For example, the central selective interface system 400 shown in FIG. 19 is provides access to an item information screen 708a, e.g. as linked through a product link icon or button 452 (FIG. 8), a marked selections comparison screen 708b, a direct external link 708c, a lower level selection interface 708d, e.g. to select more features 706, or an order/purchase interface 708q, e.g. as linked through a buy icon or button 454 (FIG. 8).

In a back-end enhancement in a criminal suspect selection system 400, e.g. 400b (FIG. 7), a retrieved image may additionally be rendered to modify features, such as to provide age progression, or to change other facial characteristics, e.g. such as the addition of a beard, moustache, glasses, and/or scar. In a back-end enhancement in a cosmetic or reconstructive surgery selection system 400, a retrieved image may additionally be rendered to modify features, such as to provide age reduction, or to display other modifiable facial characteristics, e.g. such as for nose reshaping, wrinkle removal, and/or scar reduction.

The selection interface system 400i is readily adaptable for other selection systems, such as within a graphic user selection interface for education or entertainment items. For example, with a channel or movie selection interface, a user can easily navigate to desired programming, e.g. within selectable movie dial choices for movie type, movie year, and available stars, a user can readily navigate to search for western movies starring Gary Cooper within a given year.

Product Forms. As described above, information regarding available items 514 is prepared and stored in a database 116, 516, such that the processor 102 (FIG. 3), 530 (FIG. 10) can retrieve and link appropriate selections 514.

Figure 20:
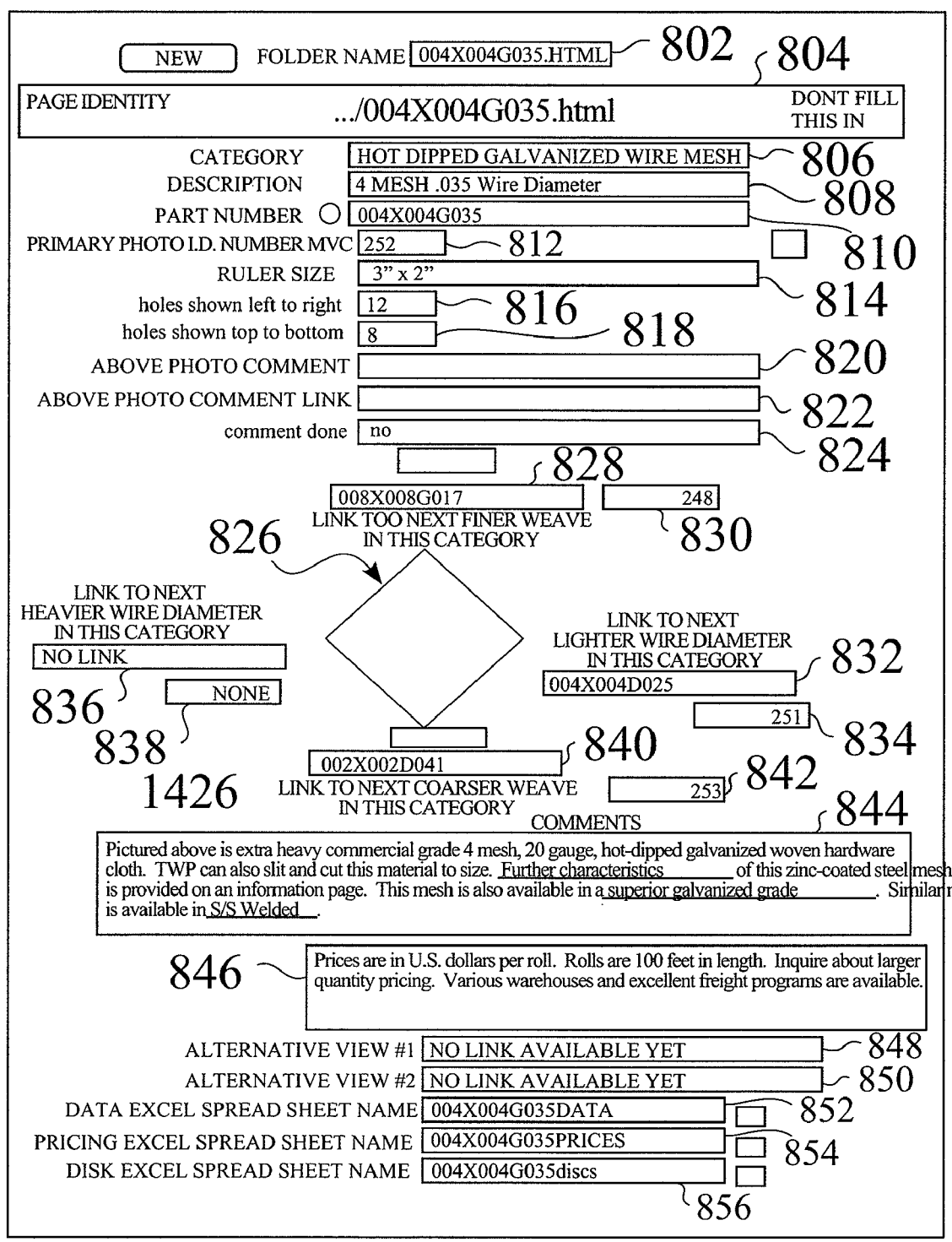
FIG. 20 is a diagram that represents a design form for a first product page.

FIG. 20 diagrams a form 800 that corresponds to the implementation of position 302 (FIG. 5). A folder name 802 is filled-in with "004X004G035.HTML", e.g., the hypertext mark-up language (HTML) for 4×4 mesh galvanized 0.035" diameter. An URL 804 designates where the HTML file will be found on the Internet, e.g., " . . . /004X004G035.html". This is read, using hypertext transfer protocol. Within the World Wide Web, at TWPINC.com, file 004X004G035.html. In actuality, the domain name server (DNS) converts the "TWPINC.com" part to a four-place Internet protocol (IP) address in the form "00.00.00.00". A category box 806 allows for a common grouping, e.g., "Hot Dipped Galvanized Wire Mesh". A description box 808 is used to enter the common product name, e.g. "4-Mesh 0.035 Wire Diameter". A part number box 810 provides information necessary to order this product, e.g., "004X004G035". A photo-ID box 812 identifies which GIF or JPG picture file relates to this particular product, e.g., "252". Such information is used to control what appears in product picture 224 (FIG. 4). A ruler-size box 814 is filled in with information that corresponds to the scale used in the picture file recited in the photo-ID box 812, e.g. such as "3 inches by 2 inches". A horizontal dimension box 816 is filled-in with the number of holes, left-to-right, represented in the product picture. A vertical dimension box 818 is filled-in with the number of holes, top-to-bottom, represented in the product picture. A photo-comment box 820 provides for comments about the product picture. A photo-comment link box 822 provides for a file or URL link to information about the product picture. A comments-done? box 824 allows work-in-progress to be marked.

Figure 1:
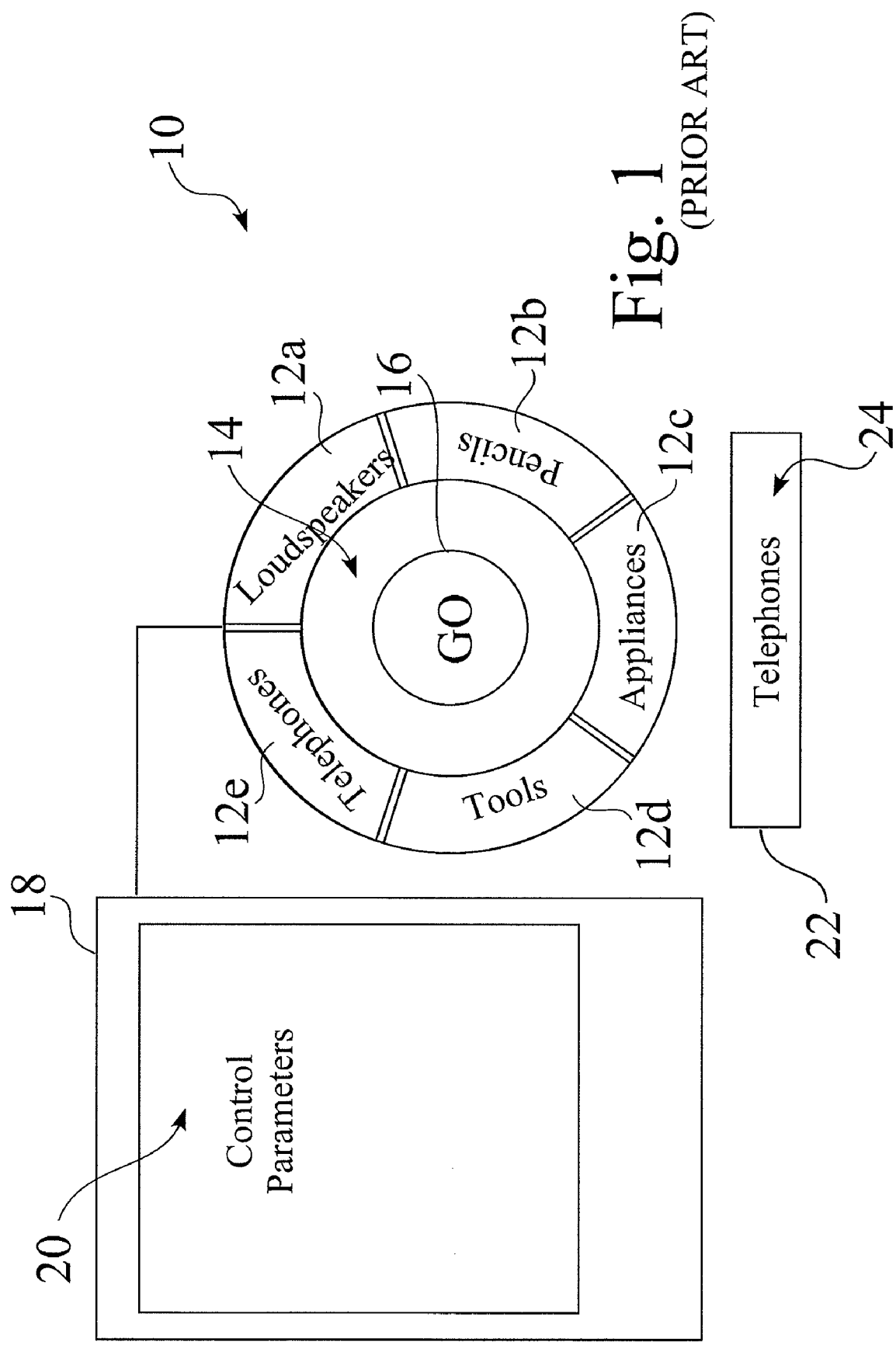
FIG. 1 is a schematic view of a prior art telephone interface.
Figure 2:
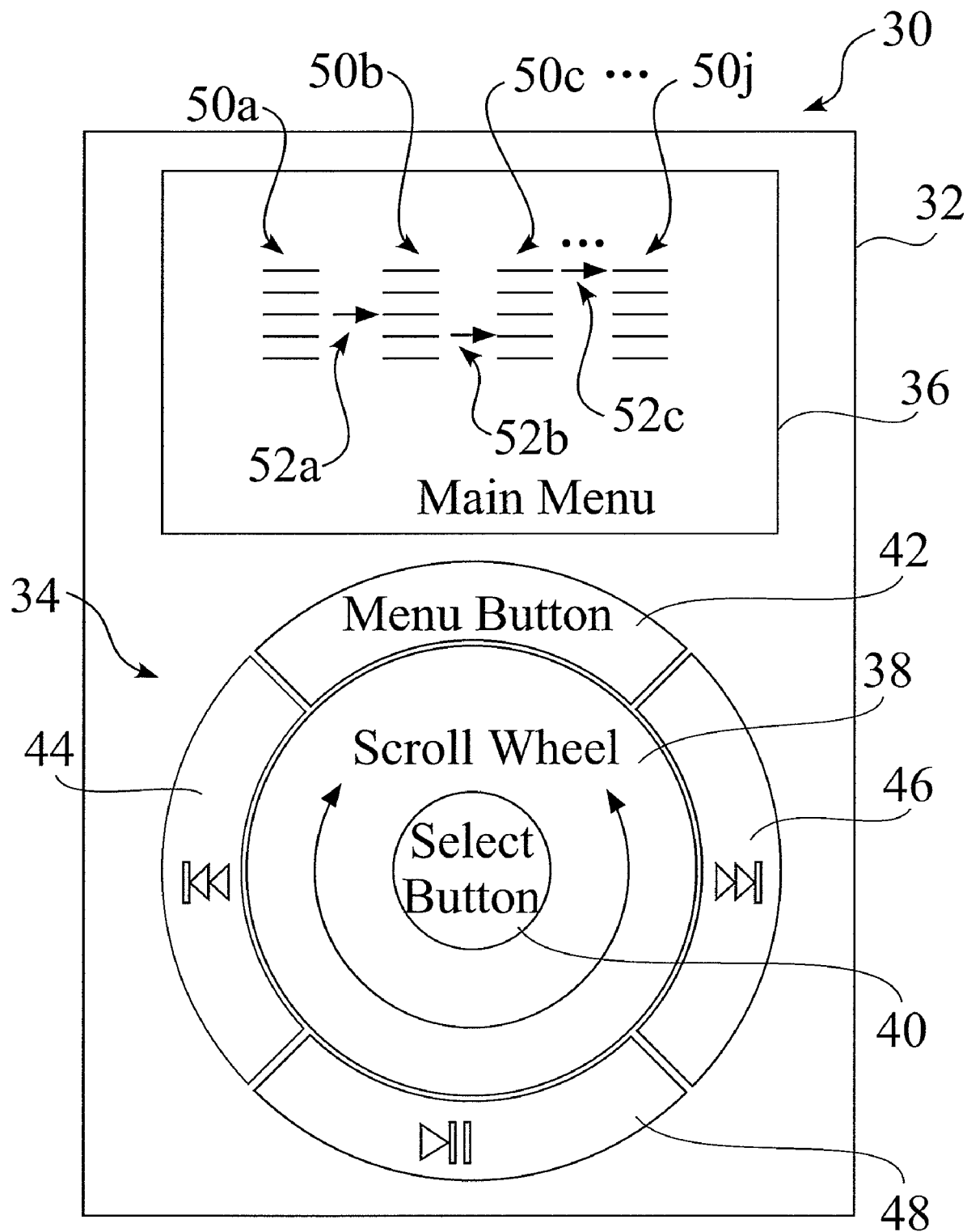
FIG. 2 is a schematic view of a prior art dial menu selection and control interface.

A four-way navigation symbol 826 signals the four directions a user can navigate, and corresponds to navigation window 202, especially buttons 210-213 (FIG. 4). A next-finer weave box 828 indicates a product description, file, or URL to be taken, e.g. "008X008G017". A next-link photo box 830 corresponds to the item in the next-finer weave box 828. A next-lighter-wire box 832 indicates a product description, file, or URL to be taken, e.g. "004X004G025". A next-link photo box 834 corresponds to the item in the next-lighter-wire box 832. A next-heavier-wire box 836 indicates a product description, file, or URL to be taken, e.g. "no-link". See, position 314 (FIG. 5). A next-link photo box 838 corresponds to the item in the next-heavier-wire box 836. A next-coarser weave box 840 indicates a product description, file, or URL to be taken, e.g. "002X002D041". A next-link photo box 842 corresponds to the item in the next-coarser weave box 840. A comments box 844 includes remarks that the webpage designer wants to appear in the comments field (FIG. 4). Similarly, a price-table comments box 846 includes remarks that the webpage designer wants to appear when prices are quoted. An alternate view-1 box 848 is used for alternative product photos that will be displayed as picture 224 in response to clicking on button 226 (FIG. 2). An alternate view-2 box 850 is used for alternative product photos that will be displayed as picture 224 in response to clicking on button 228 (FIG. 4). An Excel spreadsheet name box 854 is used to link to a corresponding prices file, e.g., as would be invoked in response to clicking button 230 (FIG. 4). A disk Excel spreadsheet name box 856 is included."

FIG. 21 diagrams a form 860 that corresponds to the implementation of position 306 (FIG. 5). A folder name 862 is filled-in with "008X008G017.HTML", e.g. the hypertext mark-up language (HTML) file for 8×8 mesh galvanized 0.017" diameter. An URL 864 designates where the HTML file will be found on the Internet, e.g. ". . ./008X008G017.html". The rest of the form 860 is similar to that represented in FIG. 20.

FIG. 22 diagrams a form 870 that corresponds to the implementation of position 310 (FIG. 5). A folder name 872 is filled-in with "002X002G041.HTML", e.g. the hypertext mark-up language (HTML) file for 2×2 mesh galvanized 0.041" diameter. An URL 874 designates where the HTML file will be found on the Internet, e.g. ". . ./002X002G041.html". The rest of the form 870 is similar to that represented in FIG. 20.

FIG. 23 diagrams a form 880 that corresponds to the implementation of position 318 (FIG. 5). A folder name 882 is filled-in with "004X004D025.HTML", e.g. the hypertext mark-up language (HTML) file for 4×4 mesh galvanized 0.025" diameter. An URL 884 designates where the HTML file will be found on the Internet, e.g. ". . ./004X004G025.html". The rest of the form 880 is similar to that represented in FIG. 20.

Figure 24:
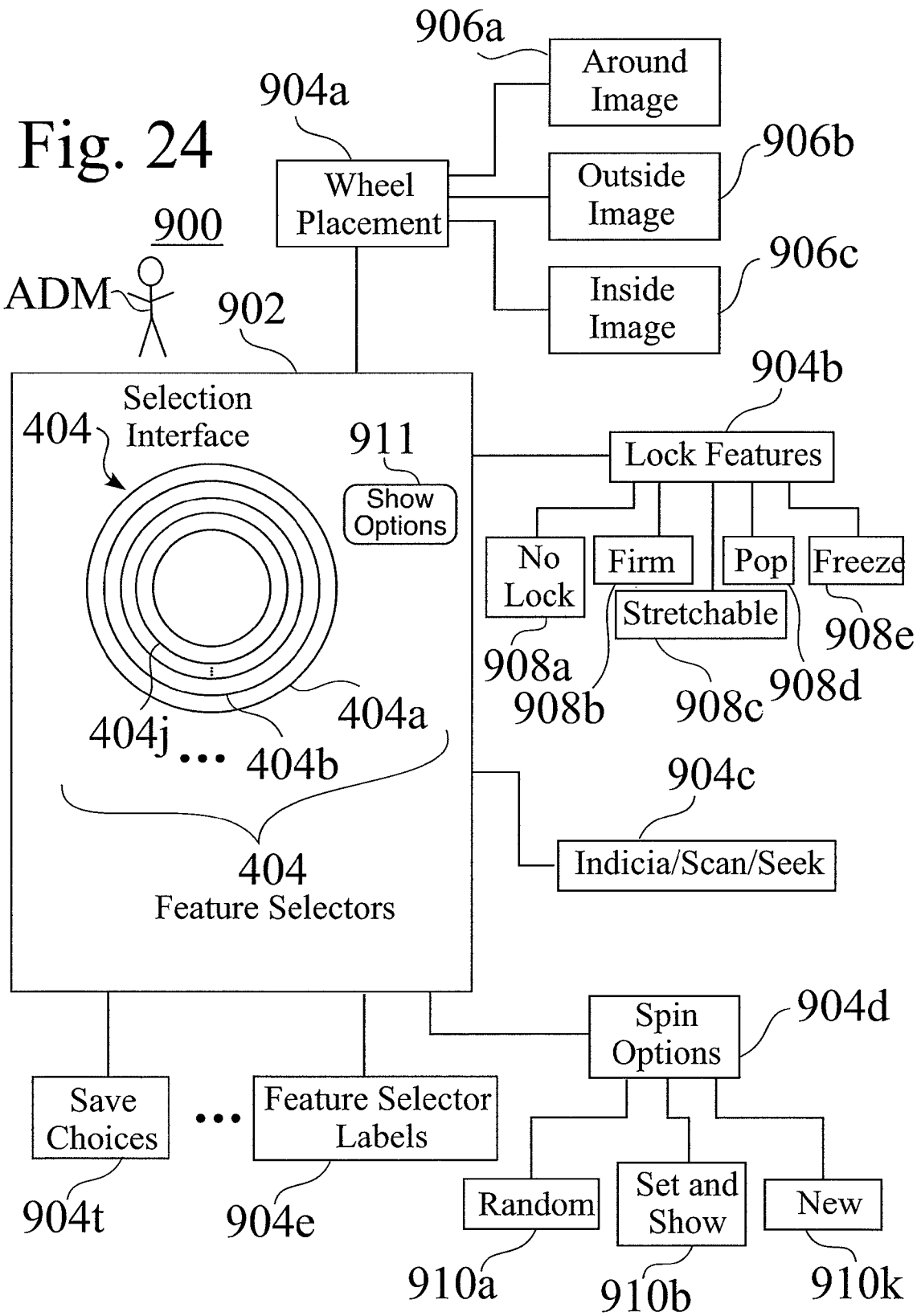
FIG. 24 shows a process for assignment and/or control of features for a selection interface system.

Enhanced Embodiments of Selection Interface Systems and Methods. FIG. 24 shows a process 900 for designation 904, e.g. 904*a*-904*t*, i.e. assignment and/or control, of features for a selection interface system 400, such as implemented though a computer or network interface 902 having one or more processors configured therewith.

As seen in FIG. 24, an administrative user or interface designer ADM or other user USR may designate 904*a* the location of one or more feature selectors 404, e.g. selector wheels 404, in relation to an image 410, such as around 906*a* an image 410, outside, i.e. alongside 906*b* an image 410, or inside 906*c* an image 410.

As also seen in FIG. 24, lock features may preferably be designated 904*b*, such as through a computer or network interface 902. For example, one or more selector wheels 404 may be designated 908*a* without associated locks 424. As well, one or more selector wheels 404 may be designated 908*b* with firm associated locks 424, e.g. such that no changes may be made in regard to a choice that has a firm lock 424.

Similarly, one or more selector wheels 404 may be designated 908*c* with flexible or stretchy associated locks 424, e.g. wherein a change may be made in regard to a choice that has a stretchy lock 424, if a user is insistent. Such a lock 424 may indicate, e.g. such as through any of image or sound, a straining to be released when the lock 424 does not allow a selection. On one such embodiment, a stretchable lock 424 may preferably pull sideways or wiggle to be set free if a specific combination of choices is not available.

For example, in a selection interface system 400 associated with vehicle selection, if a user limits possible vehicles to a mileage rating of 30-35 miles per gallon, such as by locking 424 a feature selector 404 associated with mileage, the user USR may not be able to rotate one or more feature selectors 404 to indicate a sport utility vehicle model having a V8 engine. In this example, a lock 424 set on a mileage rating of 30-35 miles per gallon may flex or otherwise show straining as the user attempts to choose a particular vehicle model. Such a straining stretch lock 424 may preferably pop 908*d* either temporarily, while the characteristic that is causing it to strain is being held, or it could pop 908*d* permanently into the next position, e.g. to a mileage selection of 25-29 miles per gallon. When a stretchy lock 424 "pops", such as from a prior position to a new position, the new position becomes the position of the previously locked wheel 404, wherein all the other parameters that were included or excluded change to be synchronized with previously selected wheels 404.

In contrast to a lock structure 424, one or more feature selector wheels 404 may preferably be selected 908*e* to "freeze up", even without a lock 424, such as if changing a given feature selector 404 would only result in an impossible choice, wherein another wheel 404 may preferably be required to be turned first. For example, in a selection interface system 400 for selecting a vehicle, a feature selector 404 associated with a vehicle model may be required to be changed or selected before allowing rotation of a feature selector 404, e.g. 404*c*, associated with interior options.

As also shown in FIG. 24, feature selectors 404 may preferably be designated 904*c* to comprise a means for selecting a position, such as by a determination of an intended discrete selection based upon approximate movement or position, e.g. in relation to indicia 926 (FIG. 29), such as but not limited to a line, a pointer or an arrowhead. For example, if a selector wheel 404 is located within a threshold of a possible selection, e.g. such as but not limited to within 5 degrees, the selector wheel 404 may act as a scanning knob, a seeking knob or a detent knob, to home into a determined position, e.g. a selectable choice. As well, one or more feature selectors may operate with virtual momentum and friction, such as to spin when acted upon by a user, and continue to spin and slow down and stop, e.g. gradually and/or upon homing in on a determined position.

As also seen in FIG. 24, feature selectors 404 may preferably be designated 904*d* also means for spinning or otherwise navigating between possible choices. For example, one or more feature selectors 404 may be designated 904*d* to spin randomly, such as to allow a user USR to view different combinations with a sequence of images 410 in the image window 408. During such a sequence, the user interface 400 may further comprise means for stopping the sequence, or for scanning forward or backward through a series of images 410.

A user USR may also select one or more of such presented images 410, and/or may lock one or more of the selection wheels 404, wherein random movement 910*a* may progress through any remaining, i.e. unlocked, feature selectors 404. For example, for a user USR that attempts to identify a red bird that they saw near the seashore, the user USR may preferably lock 424 a color feature selector 404 on "red", and similarly set a lock 424 for a "terrain" feature selector 404 on "Seashore". The user USR may then spin 904*d* one or more remaining feature selectors 404 by activating the remaining feature selectors 404, e.g. such as but not limited to a discrete button 911 to show remaining options or possibilities 910*b*, wherein all the red sea birds appear sequentially in the image window 410.

As well, one or more of the available reasonable choices may be saved in new wheels 404 for comparison and further manipulation. For example, the images 410 of red sea birds that are found in the above example could spawn a new wheel 404 for each of the possible species, e.g. such as for but not limited to further refinement.

As also seen in FIG. 24, one or more feature selectors 404 may preferably be labeled or otherwise marked 904*e*, such as to indicate where to move such a feature selector 404 to achieve a desired characteristic, such as but not limited to text, colors, shapes or icons arranged on the feature selector 404. A currently selected characteristic may preferably bloat, illuminate, or otherwise highlight, to show what is currently selected with a feature selector 404. For example, in an embodiment for selecting various options for a motorcycle, as the user USR spins a feature selector wheel 404 past motorcycle engine selections, when a "six cylinder" selection passes by an arrow or other indicia that indicates a selection, a typeface for "6 CYL" on the feature selector 404 may preferably turn to bold.

As shown in FIG. 24, a resultant image 410 on within an image window 408, as well as the settings of one or more feature selectors 404 that result in the image or selected item, may be saved 904*t*. For example, a user USR may design a pair of sneakers within a selective interface system 400, such as by selecting styles, colors, soles, and/or laces. At any point in the design process, the user USR may preferably save a resultant design, e.g. such as by dragging the image and/or the feature settings to a holding dock within a page interface.

Figure 25:
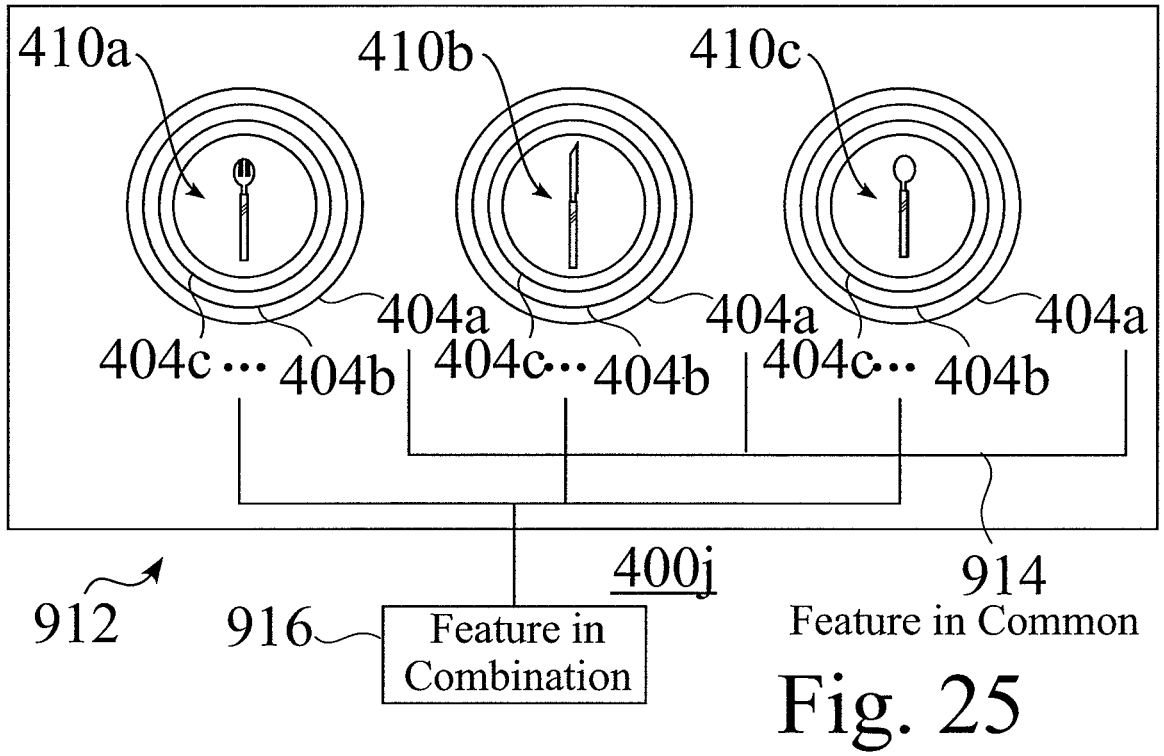
FIG. 25 shows a selective interface system having a plurality of sets of feature selectors, wherein each set of feature selectors has an associated image window.

FIG. 25 shows an exemplary embodiment of a selective interface system 400*j*, having a plurality of sets of feature selectors 404, wherein each set of feature selectors has an associated image window 408, e.g. 408*a*-408*c*. The selective interface system 400*j* seen in FIG. 25 may therefore allow a plurality of images 410, e.g. 410*a*-410*c*, to appear within the interface 400*j*. While the plurality of sets of feature selectors 404 may allow independent operation, some embodiments may provide interrelated operation, such as wherein the images 410 and/or items associated with the images 410 may comprise a set that may have at least one common feature, e.g. between a plurality of images 410 or associated items.

In one example of such a selective interface system 400*j*, a dinnerware set may commonly comprise a feature in common 914, e.g. a handle design, while separate items within a set may also have distinctive features, e.g. such as but not limited to knives, forks, spoons. As another example of such a selective interface system 400*j* may comprise a selection interface to create a design for interrelated cartoon superheroes, wherein each of the super heroes each has separate facial and/or body characteristics, but with at least one common wardrobe feature, e.g. such as but not limited to a uniform, shoes, or accessory, wherein such a common feature may be driven by a common feature selector 404, e.g. a shoe color selector. As well, while a preliminary design for a first item or image 410 may be implemented using a first set of feature selectors 404, one or more selections may be cloned or saved to neighboring feature selectors 404, e.g. such as to establish common features for a set of items, and then to modify distinctive features for different items.

The selective interface system 400, such as the selective interface system 400*j* seen in FIG. 25, may also comprise a feature in combination 916, such as but not limited to an additive interaction, between a plurality of selectable items and associated images 410, such as but not limited to a combined weight, cost, or duration. For example, if the total weight of a group of super heroes is not allowed to exceed a weight set point, and the individual wheel 404 created super heroes weight add up to over the weight set point, the wheels 404 may preferably not allow the parameter to be exceeded. In similar system embodiment 400*j*, if the cumulative weight is exceeded, the cumulative power, speed or endurance for the group may decrease.

Figure 26:
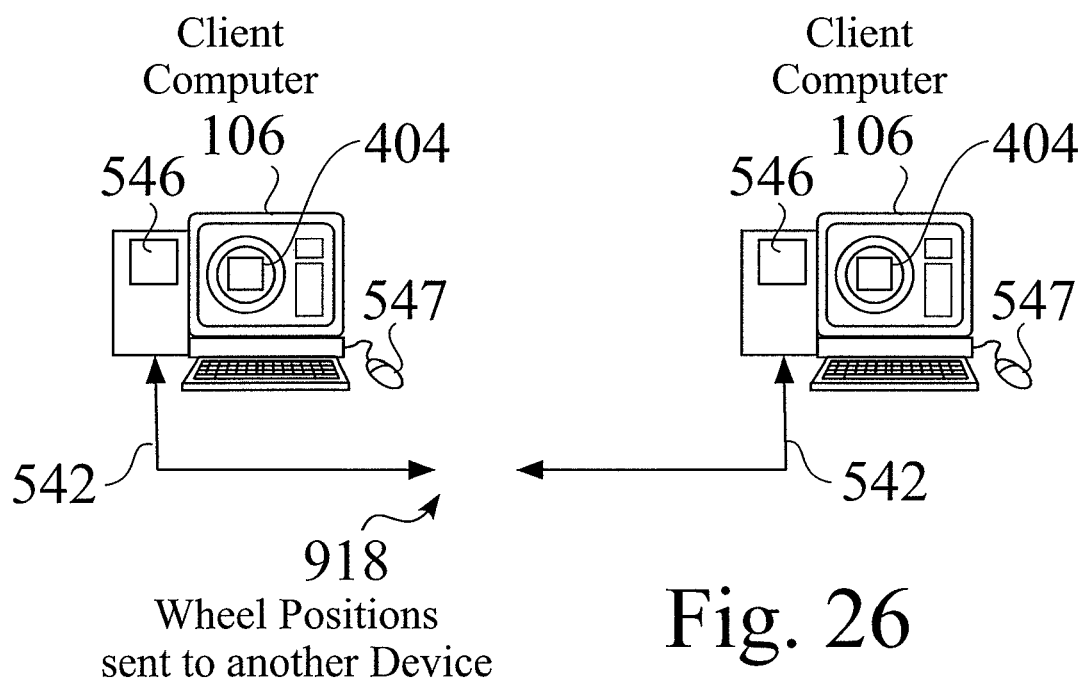
FIG. 26 is s schematic diagram that shows how information from a selective interface system can be sent to another device, such as to another selective interface system.

FIG. 26 is s schematic diagram that shows how information from a selective interface system can be sent to another device, such as to another selective interface system. The positions of one or more feature selectors 404 may be captured, such as but not limited to an electronic signal or a mechanical link. For example, a selected position of a first feature selector may be 55 degrees, while the selected position of a second feature selector is at 22 degrees. This information may thus preferably be sent or mechanically geared to a connected but remote feature selector 404 that can reproduce the image from the positions of the feature selector wheels 404.

Figure 27:
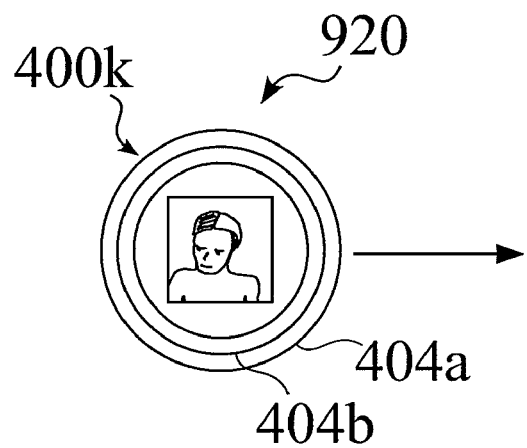
FIG. 27 shows an exemplary selection interface system, wherein an image or other content is viewed or otherwise analyzed, and wherein the positions of one or more feature selectors may be determined and stored in response to the analyzed content, such as to describe content in terms of determined positions of feature selectors.

FIG. 27 shows an alternate embodiment of a selection interface system 400*k*, wherein an image or other content 410 is viewed or otherwise analyzed, and wherein the positions of one or more feature selectors 404 are rotated in response to the analyzed content 410, such as to describe the content 410 in terms of the determined positions of the feature selectors 404. For example, a photo of a shoe may be placed on the page and analyzed, wherein the result is the wheels 404 are arranged to display the characteristics of the shoe. Similarly, an image of a face may preferably be analyzed and turned into wheel positions.

Such an embodiment may provide matchable coordinates based on known fugitives or criminals, which can then be coordinated with positions of feature selectors 404 input by one or more witnesses to a crime, such that files for one or more possible suspects may be retrieved, e.g. from a database. In such an example, a witness or law enforcement personnel may use a selective interface 400 to enter a description of a suspect, wherein the entered data results in positions of the rotatable feature selectors 404. The selected data may therefore be compared to stored analysis content from one or more databases, such as to provide a found set of files associated with one or more people, wherein the found set of files may be studied. If the found set is too large, a threshold value of one or more parameters associated with selector data may be reduced, such as to find the closest matches within a broad found set. Similarly, if the found set is too small, i.e. not enough suspects or no matches in a found set as determined by personnel, a threshold value of one or more parameters associated with selector data may be increased, e.g. such as to allow for variance in nose size or shape, wherein a new found set may yield a broader sample of suspects.

Figure 28:
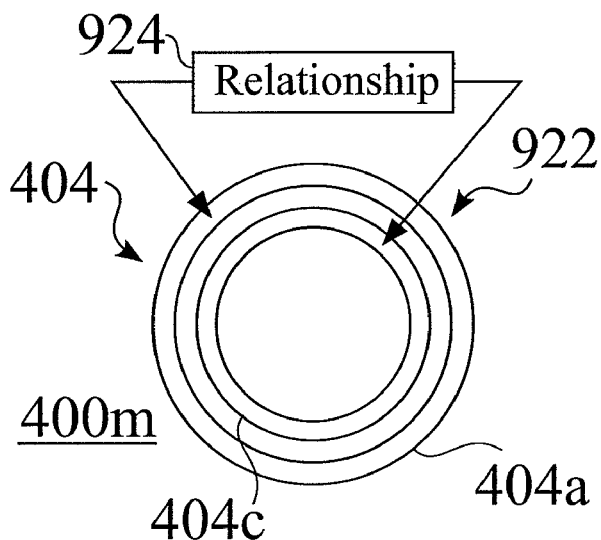
FIG. 28 shows a schematic view of a selection interface system, wherein at least two of feature selectors are joined together by a relationship.

FIG. 28 shows a schematic view 922 of a selection interface system 400*m*, wherein at least two of the feature selectors 404, e.g. 404*a* and 404*c*, are joined together by a relationship 924, e.g. any of a simple or a complex relationship. The relationship 924 may preferably link or gear features together. For example, a simple relationship link or gear 924 for a shoe design interface 400 may lock a feature selector 404, 404*c*, associated with shoe lace color to a feature selector 404, e.g. 404*a*, associated with shoe sole color, so the that feature selectors 404, e.g. 404*a* and 404*c*, turn in unison. Such selectors 404 may preferably be locked together for any of matching colors, or having different or related colors. As an example of a more complex relationship link or gear 924, the moisture needs of one selected plant may preferably be compared to the moisture needs of an adjacent plant in a selection interface 400 for landscape or garden design wherein one feature selection wheel 404, e.g. 404*c*, does not allow a non compliant plant to be chosen in an area having a plant having different needs that has been selected by another feature selection wheel 404, e.g. 404*a*.

Figure 29:
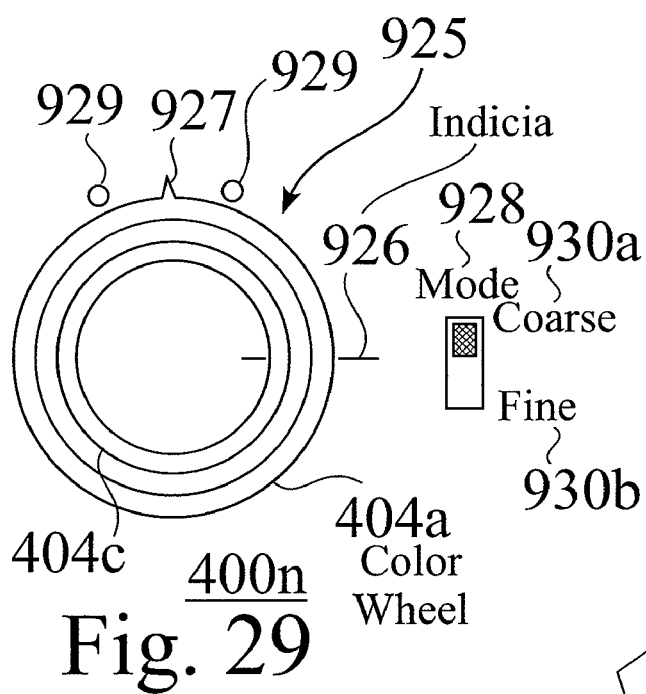
FIG. 29 shows a schematic view of a selection interface system, wherein one or more feature selector wheels may preferably provide fine tuning.

FIG. 29 shows a schematic view 925 of a selection interface system 400*n*, wherein one or more feature selector wheels 404 may preferably 404 provide fine tuning, such as by alignment of a feature selector with indicia 926. For example, in a first selection mode 930*a*, a user USR may select broad color categories, e.g. blue, red, green, yellow, etc. on a feature selector wheel 404, e.g. 404*a*, and in a second mode 930*b*, such as activated with a mode control 928, the user USR may select between different shades of a color selected in the first mode, e.g. different shades of blue.

As well, one or more feature selector wheels 404 in various embodiments of the selective interface system 400 may preferably 404 provide any of cog-like or ratchet-like features that limit the motion of the feature selectors 404. For example, a feature selector 404, e.g. a selection wheel 404, may comprise a protruding tab 927, which may be limited in travel by one or more pins 929, wherein such an interface provides a "soft lock" 424. Similarly, a feature selector 404 may be limited in motion or range by a length of a slot or arch in which a pin 927 is allowed to travel.

Figure 30:
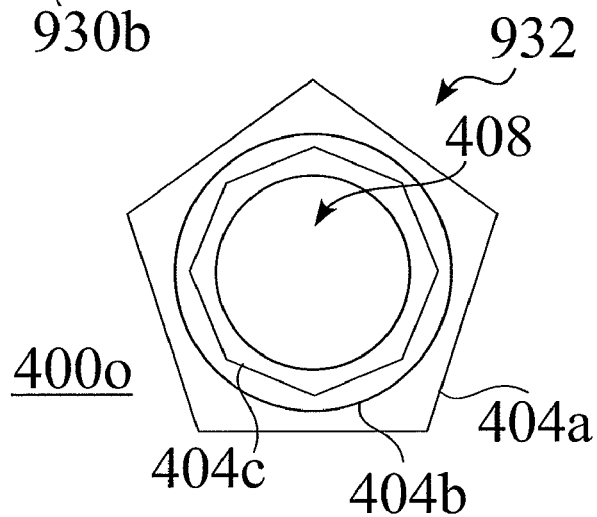
FIG. 30 shows a schematic view of a selection interface system, wherein one or more feature selectors comprise different shapes.

FIG. 30 shows a schematic view 926 of a selection interface system 400o, wherein one or more feature selectors comprise different shapes, e.g. polygons. As seen in FIG. 30, a first feature selector 404a comprises a five-sided polygon, such as associated with a feature that has five possible choices. Similarly, a third feature selector 404c comprises an octagonally shaped wheel, such as associated with a feature that has eight possible choices.

While many exemplary embodiments of the selective interface system 400 show feature selectors 404 as two-dimensional controls within the plane of an interface, alternate embodiments of the selective interface system 400 may provide a wide range of feature selector shapes.

FIG. 31 is a schematic view 934 of a selection interface system 400p, wherein one or more feature selectors 404 may a form of a mobius strip 936, such as to provide a large variety of selectable positions. FIG. 32 is a schematic view 938 of a selection interface system 400q, wherein one or more feature selectors 404 may preferably be interwoven or braided.

FIG. 33 is a schematic view 940 of a selection interface system 400r, wherein one or more feature selectors 404, e.g. 404a-404c may preferably form wheels that are configured perpendicular to the user USR, e.g. mechanically or virtually, such that the side of the feature selectors face the user USR. Only a portion of the feature selectors 404 may face the user USR at any given time, such as within a viewable region 942. The feature selectors seen in FIG. 33 may provide a large number of selections, such as with associated labels and/or icons.

FIG. 34 is a schematic view 948 of a selection interface system 400t, wherein a plurality of feature selectors 404, e.g. 404a-404c turn on uncommon centers, wherein the feature selectors 404 may preferably overlap at one or more points, such as to provide a plurality of images 410. For example, in some exemplary embodiments, each wheel 404 has numerous associated images 410. In some embodiments, as the wheels images overlap, the images either coincide or do not coincide with each other, e.g. when overlapping images overlap, one of the display regions may preferably be revealed.

FIG. 35 is a partial cutaway view 950 of a feature selector wheel 404 for a selective interface system 400, wherein the feature selector wheel 404 comprises a plurality of sides 952, e.g. 952a-952c, which are rotatable 954 to provide navigation and/or selection though different or related choices. The exemplary feature selector wheel 404 seen in FIG. 36 has three sides 952a-952c, which may preferably be flipped 954 to gain access to different choices, e.g. to provide the functionality of a plurality of feature selectors 404 within a single selector 404. In some embodiments, rotation 954 may be accessed by user interface movement that is generally perpendicular to a direction of rotation for a feature selector wheel 404, by other interface control, or based upon the context of relevant choices to be presented to a user USR.

FIG. 36 is a partial cutaway view 955 of a feature selector wheel 404 for a selective interface system 400, wherein the feature selectors 404, e.g. 404a-404c may preferably be rearranged with respect to each other, such as by a user USR. For example, as seen in FIG. 36, an innermost most feature selector wheel 404c may be moved to an outermost position, while the other feature selector wheels 404a and 404b move inward. Feature selectors 404 may preferably be rearranged for a wide variety of purposes, such as to provide sufficient room for movement, labels, and or icons. In some such embodiments 956, a large number of inner feature selectors 404 may be presented with a minimized cross sectional width, while the currently outermost feature selector 404 may be magnified over some or all of its circumference, such as to magnify available choices, labels, icons, and/or related information. As well, such a magnified region 956 may preferably provide fine resolution for movement and/or selections by a user USR, while movement of the feature selector 404 outside of a magnified region 956 may preferably provide more coarse resolution for movement and/or selections by the user USR.

FIG. 37 is a partial cutaway view 957 of a feature selector wheel 404 for a selective interface system 400u, wherein an image 410 further comprises touch sensitivity. For example, in one such embodiment 400u, if a user USR touches one part of an image, e.g. the hood of a vehicle, one or more selectors 404, such as surrounding the image 410 or within the image 410, becomes active to select associated features, e.g. engine choices. Such user actions may also initiate other content associated with the highlighted feature selector 404, such as but not limited to associated text, sound, and/or animation.

FIG. 38 is a schematic view 958 of a selection interface system 400v, wherein an image or video output 410 associated with the wheels 404 may preferably be further connected to a process or task 960, e.g. to control or produce the part or assembly in the real world, e.g. the selected object 410 does not have to be virtual. For example, the selective interface system 400u may preferably run a machine tool, e.g. a lathe, wherein the feature selectors 404 provide means for selection of a diameter, length, thread pitch, and/or thread start and length, wherein the selections may preferably exclude unrealizable thread/diameter combinations. Such controls may preferably provide selectable characteristics, such as but not limited to removing or adding material, changing the color, and/or changing the porosity of a real object. In some embodiments, the selection interface system 400v may preferably interface to a printer (2D or 3D), an automatic cocktail mixer or a gene/chromosome assembler.

FIG. 39 is a schematic view 962 of an alternate embodiment of a selection interface system 400w, wherein multiple selection interfaces 964 may preferably be synchronized, such that different versions of a resultant image 410 are saved. For example, an exemplary synchronizable selectable interface 400w may be opened that comprises a plurality of vehicle selector interfaces 964, e.g. comprising a master interface 964m and one or more slave interfaces 964s. As a user USR turns a master color wheel selector 404 on the master interface 964m, all the images 410 corresponding to the slaves 964s rotate through colors selected through the master 964m. For example, when the user USR chooses and locks red on a master exterior color selection wheel 404, both the master 964m and the slaves 964s display red vehicle images 410. Similarly, the user USR may rotate the master tire color selector wheel 404, wherein all the vehicle images 410 show cars with black tires.

While features that are consistent throughout all the choices are typically selectable through the master interface 964m. features that are meant to be specific may preferably be selectable through one or more of the slave interfaces 964s. For example, in one of the slave interfaces 964 described above, the user USR may selectably rotate a body style selector to a "Sedan" and lock the selection 424. Similarly, the user USR may selectably rotate a body style selector on another slave interface 964s to a "Convertible" and lock the selection 424. For such a synchronizable interface 400w having six slave interfaces 964s, the user USR can therefore synchronize common features, e.g. all having a red exterior and black tire color, with other specific features called out across each of the slave interfaces, e.g. such as but not limited to body styles, interior colors, and/or other options, along with calculated prices, and/or estimated availability. The user can therefore operate the synchronizable interface for any of:

turning a selector wheel 404 on the master, wherein all the images change;
  locking a selector wheel on the master, wherein all the slave images lock 424;
  turning a selector wheel on any slave, wherein just that slave image changes; and/or
  locking 424 a selector wheel on any slave, wherein just that slave is locked 424.

In various embodiments of the selective interface system 400, such as but not limited to the synchronizable interface 400w seen in FIG. 39, the position of one or more feature selectors 404 for showing a selectable characteristic may preferably be expressed in a quantifiable value, such as but not limited to any of degrees, clock hour positions, and/or radians. For example, in the synchronizable interface 400w seen in FIG. 39, a car color selector may have:

a value of 45 degrees associated with an exterior color selection of "Red"
  a value of 85 degrees associated with a tire color selection of "Black wall"; and/or
  a value of 27 degrees associated with a Body Type selection of "Coupe".

FIG. 40 is a schematic view 968 of an alternate embodiment of a selection interface system 400x, having one or more feature selectors 404, e.g. 404a-404c for any of controlling the characteristics of a typeface or font 970, controlling the characteristics of one or more passages of text, or establishing or modifying default styles that can later be selected by a user USR, e.g. such as for style sheet selection within a page layout program. For example, the feature selectors 404 may be rotatable for selection of any of height, color, serif length, boldness, slant angle, and spacing of a font as shown by a displayed letter or word or paragraph. While the rotatable feature selectors 404 may preferably control text in a manner similar in pull down menus, the feature selectors may preferably readily provide a wide spectrum of control within an intuitive interface 400x. For example, a user USR may readily control text size, leading and kerning with real-time scaling as shown within the display region 408, with coarse as well as fine tuning.

FIG. 41 is a schematic view 972 of an alternate embodiment of a selection interface system 400y, wherein one or more feature selectors 404, e.g. 404a-404c control the properties, selection and/or arrangement of objects or articles 974 in two dimensional or three dimensional space, and/or relationships between objects. For example, a user USR may specify any of:

the length of an arm 972;
  the position of the arm 972;
  what is located at the ends of the arm 972, e.g. a cable hanging down, a pointed stick, etc.;
  what is located below the cable 972, e.g. a bucket, a snow cone, etc.; and/or
  what is located in the space under the bucket, e.g. a dump truck, a basketball hoop, etc.

The selection interface system 400y allows objects to be described and/or moved spatially in relation to other objects. For example, a user USR may spin a feature selection 404 to move an object from the foreground through the middle ground toward the background. As well, the selection interface system 400y may preferably allow a user to control and/or modify the characteristics of one or more objects, such as for any of color, size, motion, position, and/or movement.

In some embodiments, the selective interface system 400, e.g. 400y, may control the position of an object in space by choosing the coordinates of the object. For example, a camera may be located at X32, Y12, and Z66, while the camera lens is pointed at an object at X88, Y33, and Z744. In this example, as the user USR moves a selector wheel for movement of the camera in the X-direction, the wheel may stop when it gets to X88, because that is as far as it can actually logically move, as the camera or virtual camera arrives at a target object.

Figure 42:
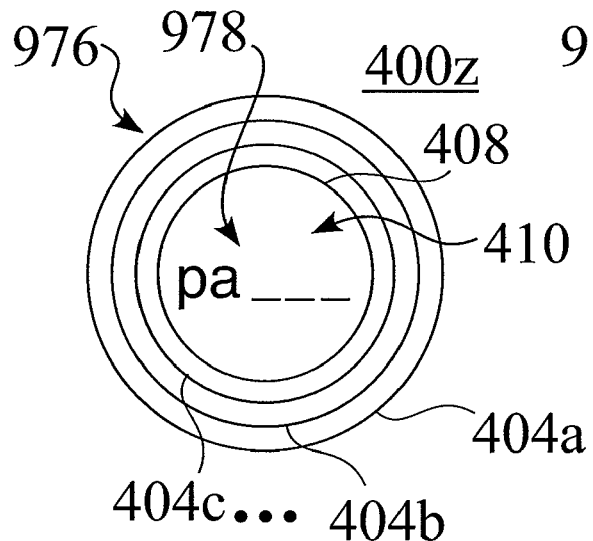
FIG. 42 is a schematic view of an alternate embodiment of a selection interface system, wherein one or more feature selectors control the selectable characteristics of a portion of text.

FIG. 42 is a schematic view 976 of an alternate embodiment of a selection interface system 400z, wherein one or more feature selectors 404, e.g. 404a-404c control the selectable characteristics of a portion of text 978, e.g. such as but not limited to a word, a phrase, or a sentence. For example, feature selectors 404 may select any of:

how many letters;
  first letter;
  prefix, suffix;
  what language, e.g. English, Spanish.

The selection interface system 400z may include entry of all possible characters, or may limit selection to letter combinations that are considered to be allowable, such as by discarding non-logical combinations. For example, FIG. 42 shows the first two letters "pa" of a five letter word, wherein logical combinations may allow continued entry of letters associated with the words "paint" or "party". The selection interface system 400z may also provide definitions for entered words, and may also provide one or more feature selectors to suggest related words, synonyms, and/or antonyms.

Figure 43:
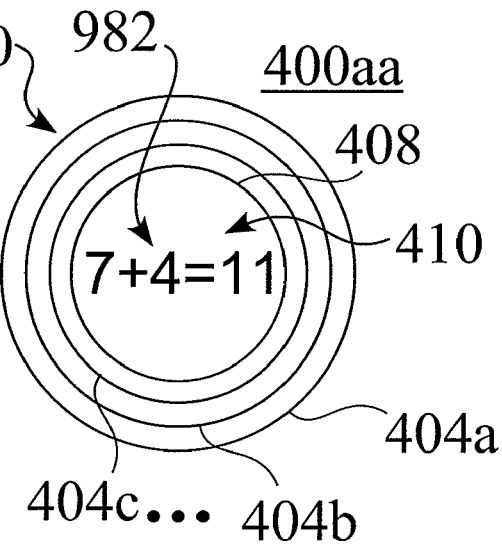
FIG. 43 is a schematic view of an alternate embodiment of a selection interface system, wherein one or more feature selectors control the selectable characteristics of variable parts of a mathematical equation.

FIG. 43 is a schematic view 980 of an alternate embodiment of a selection interface system 400aa, wherein one or more feature selectors 404, e.g. 404a-404c control the selectable characteristics of variable parts of a mathematical equation 982. For example, a first feature selector 404a may be used to enter a first number, a second feature selector 404b may be configured for entry of an operator, e.g. +, −, *, or /, and a third feature selector 404c may be configured for entry of a second number. As seen in FIG. 43, the selection interface system 400aa may readily allow entry of the equation 7+4=11. In this example, changing the second feature selector 404b from a "+" to a "−" would change the equation to 7−4=3.

Figure 44:
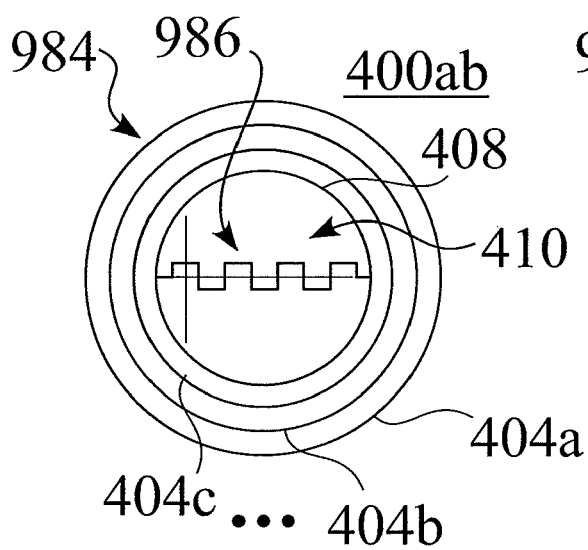
FIG. 44 is a schematic view of an alternate embodiment of a selection interface system, wherein one or more feature selectors control the selectable characteristics of a waveform.

FIG. 44 is a schematic view 984 of an alternate embodiment of a selection interface system 400ab, wherein one or more feature selectors 404, e.g. 404a-404c control the selectable characteristics of a waveform 986, such as to vary the characteristics of frequency, and amplitude. For example, the selection interface system 400ab may be used either to display a virtual, i.e. calculated, waveform, or may be used for selective control of a real waveform, e.g. a square wave 986 at 60 hz with 120 volts. In some embodiments, the selection interface system 400ab may preferably provide selection and/or control for other wavelengths, such as for but not limited to sound, RF, light. lasers, and/or x-rays. While some embodiments the selection interface system 400ab may provide variable control for any waveform parameter, other embodiments of the selection interface system 400ab may limit selections available through the feature selectors 404 to possible choices, thus avoiding impossible combinations.

Figure 45:
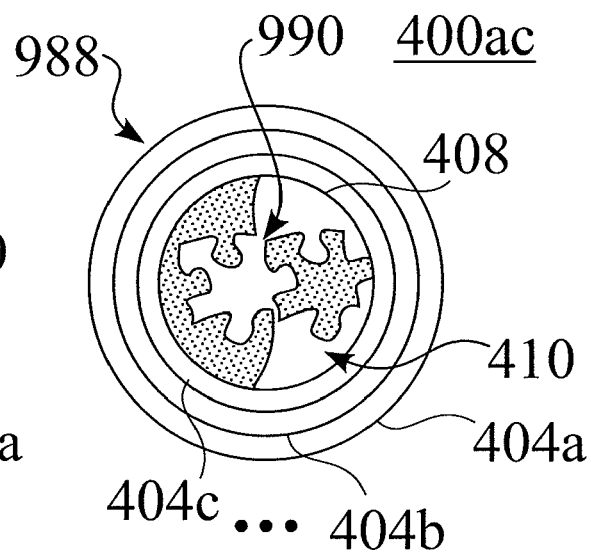
FIG. 45 is a schematic view of a selection interface system, wherein one or more feature selectors select, control, and/or determine a set of matchable characteristics.

FIG. 45 is a schematic view 988 of an alternate embodiment of a selection interface system 400ac, wherein one or more feature selectors 404, e.g. 404a-404c select, control, and/or determine a set 990 of matchable characteristics. For example, as seen in FIG. 45, one or more existing pieces of a puzzle are located on the left side of a screen 410. A user USR can change one or more settings on the feature selectors 404, such as to identify features or characteristics of an unknown "next" piece, e.g. by building an image to match an image, and/or manipulate known pieces that may be used to match the puzzle, until a match is found. The selection interface system 400*ac* may be implemented for a wide variety of applications, such as for but not limited to recreation, e.g. puzzles, design, chemical engineering, and/or medicine.

Figure 46:
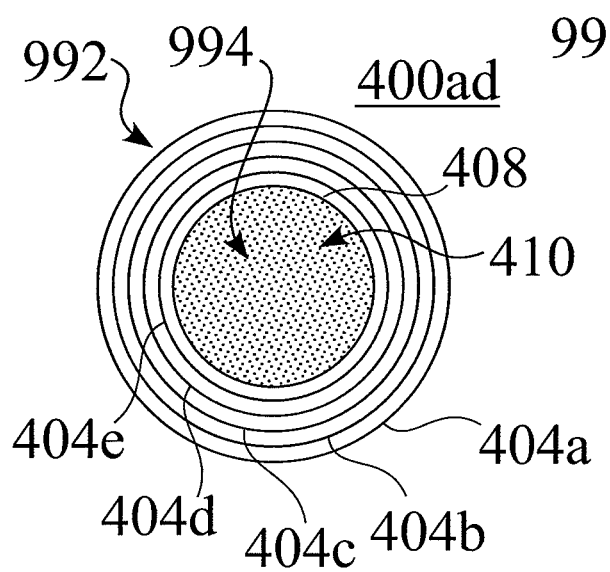
FIG. 46 is a schematic view of an alternate embodiment of a selection interface system, wherein one or more feature selectors select, control, and/or modify colors.

FIG. 46 is a schematic view 992 of an alternate embodiment of a selection interface system 400*ad*, wherein one or more feature selectors 404, e.g. 404*a*-404*e* select, control, and/or modify colors, such as through selection of a large variety of visual characteristics. The exemplary embodiment 400*ad* seen in FIG. 46 may provide controls such as:

a first feature selector 404*a*: color, e.g. selection of basic color value a second feature selector 404*b*: Lightness/Darkness, e.g. selection from a series of the lightness/darkness levels);

a third feature selector 404*c*: saturation level;

a fourth feature selector 404*d*: blurry to sharp; and a fifth feature selector 404*e*: glowing edges, e.g. none to wide.

Figure 47:
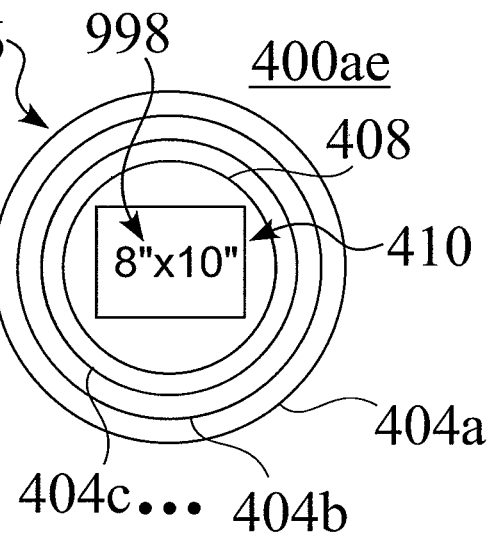
FIG. 47 is a schematic view a selection interface system, wherein one or more feature selectors may preferably be used to select size, such as for selection of a specified size of an object, or for selection of a specific object from a variety of objects having different possible sizes.

FIG. 47 is a schematic view 996 of an alternate embodiment of a selection interface system 400*ae*, wherein one or more feature selectors 404, e.g. 404*a*-404*e* may preferably be used to select size 998, such as for selection of a specified size of an object, or for selection of a specific object from a variety of object having different possible sizes. For example, a user may preferably select from different sizes 998 of standard photographic prints, e.g. 4 inch by 6 inch, 8 inch by 10 inch, or 11 inch by 14 inch. In another example, a user may preferably display an image corresponding to any of a big car, a medium sized car, or a compact car.

Figure 48:
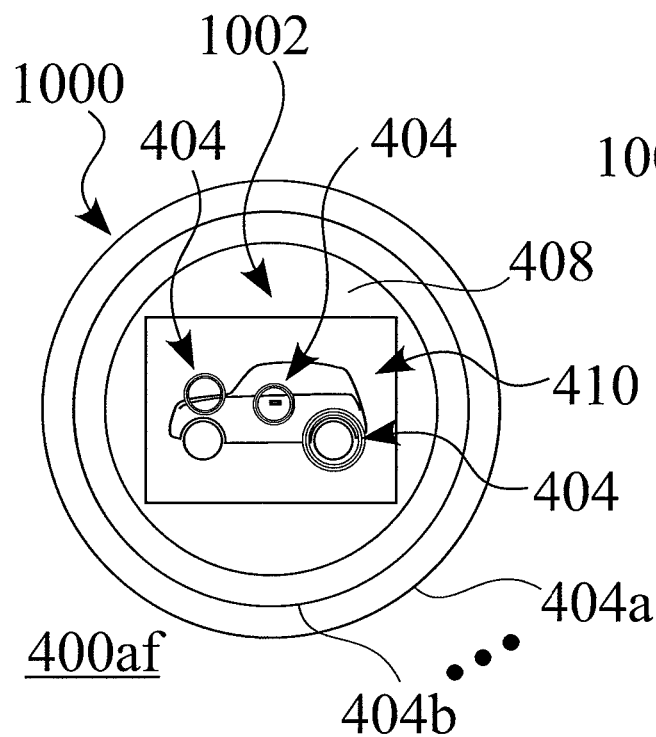
FIG. 48 is a schematic view a selection interface system having embedded feature selectors.

FIG. 48 is a schematic view 1000 of an alternate embodiment of a selection interface system 400*af*, wherein one or more main, i.e. outer, feature selectors 404, e.g. 404*a*-404*e* may preferably be used to determine a first selection, such as resulting in a primary image 410 within a primary display area 408. For example, as seen in FIG. 48, a user USR may preferably choose a particular vehicle model, wherein an associated image 410 is presented within display 408.

As also seen in FIG. 48, additional feature selectors 404, such as surrounding features within the image, and/or possibly having further presentable images 410, allow hierarchical selection of specific features. In the example shown in FIG. 48, one or more feature selectors 404 are located over the engine compartment, wherein a user may preferably allow user selection of power plant characteristics, e.g. such as but not limited to power, efficiency, alternate fuel, electric or hybrid options, and/or materials. Similarly, one or more embedded feature selectors 404 may be located over a battery compartment for a selected electric vehicle, wherein a user may select battery characteristics, such as but not limited to size, power, Ni Cad or Zinc, plug-in vs. welded in place, and/or lifetime rating.

The selection interface system 400*af* therefore provides one or more specific feature selectors 404 to be located within an image 410 associated with a general feature selector 404, such as to further refine an object 410 that is chosen by a more top level feature selector 404. The user USR can therefore navigate downward to make selections in regard to objects that have multiple levels of selectable characteristics, or upward to make more general selections 404.

Figure 49:
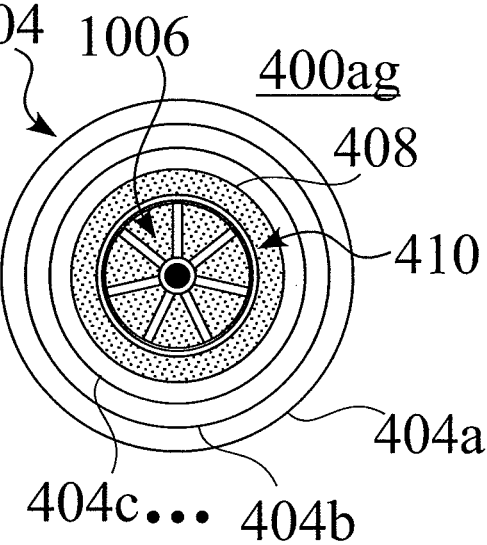
FIG. 49 is a schematic view of a selection interface system, wherein a hierarchy may be established between feature selectors.

FIG. 49 is a schematic view 1004 of an alternate embodiment of a selection interface system 400*ag*, wherein a hierarchy 1006 may preferably be established between feature selectors 404, wherein the characteristic associated with a feature selector 404 may preferably be selected by other wheels 404. For example, for the design or specification of a vehicle, many characteristics are commonly used to define the vehicle, such as but not limited to body style, engine type, exterior color, interior material, interior color, and wheel type. In the exemplary embodiment 400*ag* shown in FIG. 49, an outer feature selector 404*a* may be turned to select what an inner selector 404, e.g. 404*b*, controls. For example, if the first feature selector 404*a* is turned to wheel type, the second wheel selector 404*b*, reflects choices appropriate to different possible selections of wheel type, e.g. such as but not limited to steel, 17 inch five spoke alloy, or 18 inch 7 spoke gray anodized alloy.

Figure 50:
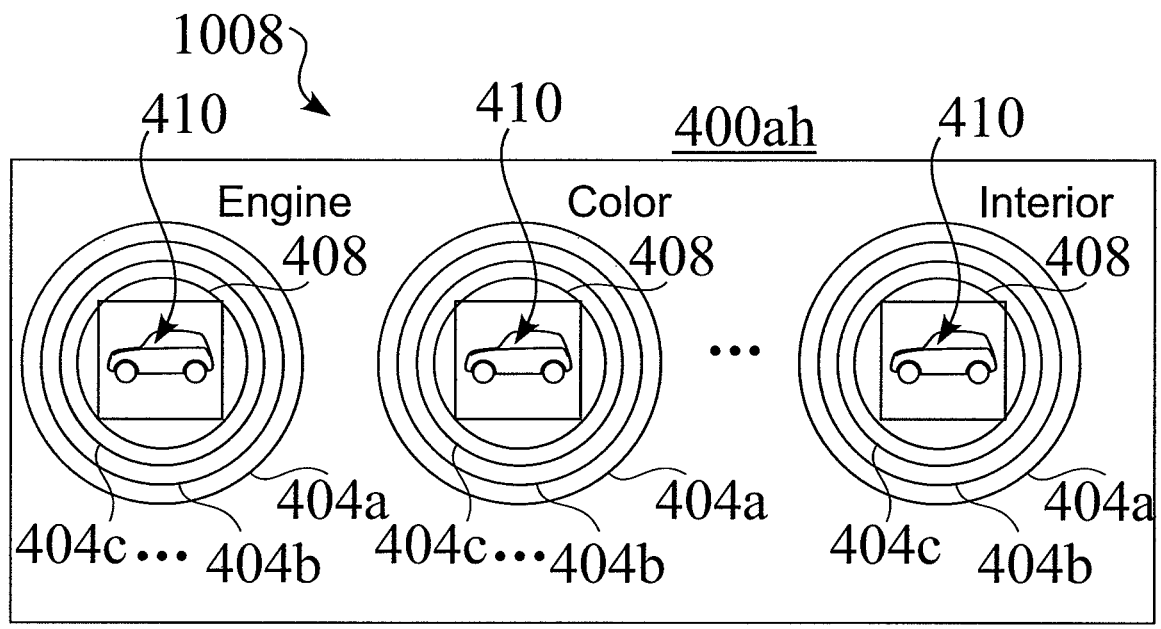
FIG. 50 is a schematic view of a cascading selection interface having a plurality of feature selection interfaces, wherein each of the sets of feature selectors have an identical image, and wherein each set of wheels controls a single characteristic in all of the images.

FIG. 50 is a schematic view 1008 of a cascading selection interface system 400*ah* having a plurality of feature selection interfaces 404, e.g. 404*a*-404*c*, wherein each of the sets of feature selectors 404 have an identical image 410, while each set of wheels controls a single characteristic in all of the images 410. For example, in the exemplary embodiment seen in FIG. 50, the three sets of feature selectors 404 are labeled for selection of "Engine", "Color", and "Interior". While the user USR controls specific selectable aspects of the vehicle through a designated set of feature selectors 404, the resultant image 410 is shown in all of the associated display areas 408. Therefore, if any selection results in a change to the image 410, the change is updated in all of the images. The user USR may rapidly make changes to the selection, using the plurality of sets of feature selectors 404.

Figure 51:
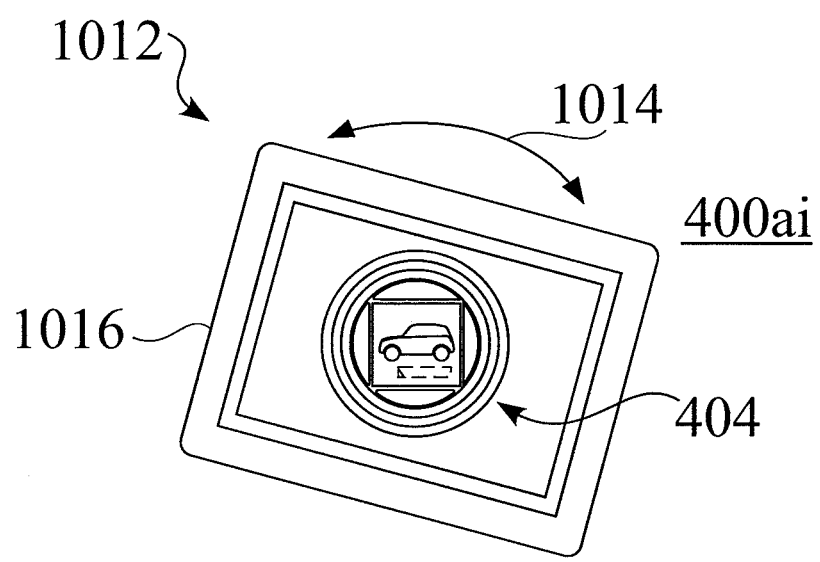
FIG. 51 is a schematic view of an alternate embodiment of a selection interface system, wherein a user may rotate the body of a page or interface around a stationary feature selector.

FIG. 51 is a schematic view 1012 of an alternate embodiment of a selection interface system 400*ai*, wherein a user may rotate 1014 the body of a page or interface around a stationary feature selector, such as to make a selection or to provide navigation through possible selections. The selection interface system 400*ai* may be implemented for a wide variety of portable devices, such as smart phones or pads that have gyroscopic or other motion sensitive input, wherein one or more selections may be made by any of rotation, turning or shaking motions that act as inputs to feature selectors 404.

System Advantages. The user selection system 400 readily provides a means whereby a user can quickly and efficiently browse, select, compare, and view items, such as within an Internet merchandising system. Rather than random or categorized navigation between a large plurality of products, a user USR may readily select from within a small variety of items which meet desired selection parameters 406*a*-406*j*, within an intuitive dial interface. Images 410 and other information is quickly retrieved and displayed for the user, typically within the same interface 400, such that the user can quickly select an item, product, or other commodity from a large universe of items, products, or other commodities.

Although the invention is preferably described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented selection interface system, comprising:
   at least one database comprising storage of information associated with a plurality of items, wherein the information associated with each corresponding item comprises
      one or more characteristics that correspond to the item, and
      at least one image of at least a portion of the item;
   a user interface comprising
      an image window, and
      at least one feature selector for user selection of one or more selectable characteristics, wherein at least one of the feature selectors comprises a rotatable selector; and
   a processor;
   wherein upon user selection of one or more of the selectable characteristics by a user through the interface, the processor is configured to
      determine which of the plurality of items in the database have characteristics that match the characteristics selected by the user,
      retrieve at least one corresponding image for each of the items that are determined to have characteristics that match the characteristics selected by the user, and
      display the at least one retrieved image within the image window;
   wherein the processor is configured to provide at least one selection lock that is operable to lock a selected parameter within a selectable characteristic, wherein only items that meet a locked parameter are available for presentation to a user within the image window.

2. The selection interface system of claim 1, wherein the at least one selection lock associated is associated with a corresponding rotatable selector.

3. The selection interface system of claim 2, wherein the at least one selection lock comprises any of a firm lock to prevent any change to a selection or a flexible lock that allows a change if the user is insistent.

4. The selection interface system of claim 2, wherein the at least one selection lock may provide any of popping between allowable positions, or freezing at an allowable position.

5. The selection interface system of claim 1, wherein one or more of the rotatable selectors are located any of surrounding the image window, inside the image window, or outside the image window.

6. The selection interface system of claim 1, wherein one or more of the rotatable selectors provide a mechanism for advancing through a sequence of the retrieved images that have characteristics that match the characteristics selected by the user.

7. The selection interface system of claim 6, wherein the mechanism for advancing through the sequence of images comprises any of random movement or sequential movement.

8. The selection interface system of claim 1, wherein one or more of the rotatable selectors further comprise a mechanism for indication of selectable characteristics, wherein the indication means comprises any of text, colors, shapes or icons.

9. The selection interface system of claim 1, further comprising:
   a mechanism for saving any of images or settings that correspond to selected positions of one or more of the rotatable selectors.

10. The selection interface system of claim 1, wherein the processor is configured to effect the display of a plurality of sets of rotatable selectors, each having an associated image window, wherein user selection for the plurality of sets of rotatable selectors is associated with any of a feature in common or a feature in combination between each of the sets.

11. The selection interface system of claim 1, further comprising:
   a mechanism for transmitting any of an image or settings of the rotatable selectors to another device.

12. The selection interface system of claim 1, wherein the processor is further configured to provide analysis of any of an image or content, and to determine positions of one or more of the rotatable selectors to correspond to the analyzed content.

13. The selection interface system of claim 1, wherein at least two of the rotatable selectors further comprise a relationship there between.

14. The selection interface system of claim 1, wherein at least one the rotatable selectors further comprises a mechanism for any of preventing rotation;
   fine or coarse movement between selectable positions;
   determining a selected position based upon a threshold of selection; or
   ratcheting between selectable positions.

15. The selection interface system of claim 1, wherein at least one the rotatable selectors comprises a shape comprising any of a circle and a polygon.

16. The selection interface system of claim 15, wherein the number of sides of the polygon corresponds to the number of selectable positions for the rotatable selector.

17. The selection interface system of claim 1, wherein one or more of the rotatable selectors are configured as any of
   a mobius strip;
   a spiral;
   an interwoven pattern;
   a braided pattern;
   a knot;
   perpendicular to a user;
   one or more spirals; or
   upon uncommon centers.

18. The selection interface system of claim 1, wherein at least one the rotatable selectors comprises a plurality of sides corresponding to different selections.

19. The selection interface system of claim 1, wherein the rotatable selectors are rearrangable with respect to each other by a user.

20. The selection interface system of claim 1, wherein at least a portion of the image that is retrievably displayable within the image window is touch sensitive to initiate access to one or more of the rotatable selectors.

21. The selection interface system of claim 1, wherein any of the image that is retrievably displayable within the image window or video content that is associated with the rotatable selectors is linked to any of a process or task.

22. The selection interface system of claim 1, wherein a plurality of selection interfaces are synchronizable with respect to each other.

23. The selection interface system of claim 1, wherein the position of one or more of the rotatable selectors comprises a quantifiable value.

24. The selection interface system of claim 1, wherein one or more of the rotatable selectors control any of the characteristics of any of a typeface or font, the characteristics of one or more passages of text, or the characteristics of a text layout style template.

25. The selection interface system of claim 1, wherein one or more of the rotatable selectors control any of properties of objects, selection of objects, arrangement of objects, positions of objects, relationships between objects, or selectable characteristics of at least a portion of text.

26. The selection interface system of claim 1, wherein one or more of the rotatable selectors control selectable characteristics of one or more parts of any of a mathematical equation, or a waveform.

27. The selection interface system of claim 1, wherein one or more of the rotatable selectors are configured for any of selection, control, or determination of any of matchable characteristics, color, or size.

28. The selection interface system of claim 1, wherein at least one of the rotatable selectors is configured for provide hierarchical control of at least one of the other rotatable selectors.

29. The selection interface system of claim 1, wherein the selection interface is implemented on any of a device or a page, and wherein a user may rotate the device or page for any of selection or navigation in relation to a stationary one or the rotatable selectors.

30. A method, comprising the steps of:
  storing information associated with a plurality of items in at least one database, wherein the information associated with each corresponding item comprises
    one or more characteristics that correspond to the item, and
    at least one image of at least a portion of the item;
  providing a user interface comprising
    an image window, and
    at least one feature selector for user selection of one or more selectable characteristics, wherein at least one of the feature selectors comprises a rotatable selector;
  providing at least one selection lock that is operable to lock a selected parameter within a selectable characteristic;
  receiving a selection of one or more of the selectable characteristics by a user through the interface;
  determining which of the plurality of items in the database have characteristics that match the characteristics selected by the user;
  retrieving at least one corresponding image for each of the items that are determined to have characteristics that match the characteristics selected by the user; and
  displaying the at least one retrieved image within the image window;
  wherein only items that meet a locked parameter are available for presentation to a user within the image window.

* * * * *